United States Patent
Khan et al.

(10) Patent No.: US 11,770,182 B2
(45) Date of Patent: Sep. 26, 2023

(54) ADAPTING PHY LAYER PROCEDURES FOR A MOVING RAN IN NON-TERRESTRIAL NETWORKS

(71) Applicant: TELEFONAKTIEBOLAGET LM ERICSSON (PUBL), Stockholm (SE)

(72) Inventors: Talha Khan, Santa Clara, CA (US); Olof Liberg, Enskede (SE); Helka-Liina Määttänen, Helsinki (FI); Yi-Pin Eric Wang, Fremont, CA (US); Xingqin Lin, Santa Clara, CA (US)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 321 days.

(21) Appl. No.: 17/283,509

(22) PCT Filed: Oct. 7, 2019

(86) PCT No.: PCT/IB2019/058531
§ 371 (c)(1),
(2) Date: Apr. 7, 2021

(87) PCT Pub. No.: WO2020/075044
PCT Pub. Date: Apr. 16, 2020

(65) Prior Publication Data
US 2021/0399797 A1 Dec. 23, 2021

Related U.S. Application Data

(60) Provisional application No. 62/742,897, filed on Oct. 8, 2018.

(51) Int. Cl.
*H04W 36/22* (2009.01)
*H04B 7/185* (2006.01)
*H04W 36/30* (2009.01)

(52) U.S. Cl.
CPC ..... *H04B 7/18541* (2013.01); *H04B 7/18519* (2013.01); *H04W 36/22* (2013.01); *H04W 36/30* (2013.01)

(58) Field of Classification Search
None
See application file for complete search history.

(56) References Cited

U.S. PATENT DOCUMENTS

| 6,128,488 A | 10/2000 | Sauvageot et al. |
| 2016/0323032 A1 | 11/2016 | Ulupinar et al. |

(Continued)

FOREIGN PATENT DOCUMENTS

| CN | 104849740 A | 8/2015 |
| CN | 106487438 A | 3/2017 |

(Continued)

OTHER PUBLICATIONS

Chinese Office Action for Chinese Patent Application No. 2019800809337, dated Mar. 24, 2022, 13 pages.

(Continued)

*Primary Examiner* — Kodzovi Acolatse
(74) *Attorney, Agent, or Firm* — Sage Patent Group

(57) ABSTRACT

A wireless device is operable to communicate with a network node of a communications network via a non-terrestrial communication path that includes satellites and satellite gateways. The wireless device determines that communication between the wireless device and the network node will experience a communication interrupting transition during a transition period in which the non-terrestrial communication path between the wireless device and the network node will be interrupted. The wireless device adjusts a PHY layer procedure of the wireless device to mitigate switching problems with one of the of satellites during and/or after the interruption.

24 Claims, 20 Drawing Sheets

(56) References Cited

U.S. PATENT DOCUMENTS

| | | | |
|---|---|---|---|
| 2017/0099120 A1* | 4/2017 | Damnjanovic | H04B 7/2041 |
| 2018/0070273 A1* | 3/2018 | Sleight | H04L 65/612 |
| 2020/0029265 A1* | 1/2020 | Choquette | H04W 36/0011 |
| 2020/0052782 A1* | 2/2020 | Wang | H04W 76/27 |
| 2020/0137637 A1* | 4/2020 | Xu | H04W 36/0055 |
| 2020/0204250 A1* | 6/2020 | Ravishankar | H04B 7/18541 |
| 2021/0058983 A1* | 2/2021 | Schmidt | H04W 36/0085 |
| 2021/0175964 A1* | 6/2021 | Kusashima | H04B 7/18513 |
| 2021/0258844 A1* | 8/2021 | Kim | H04W 36/0058 |
| 2021/0282201 A1* | 9/2021 | Shi | H04W 76/12 |
| 2021/0314828 A1* | 10/2021 | Kim | H04W 36/0058 |

FOREIGN PATENT DOCUMENTS

| | | |
|---|---|---|
| CN | 107852230 A | 3/2018 |
| WO | 2017023576 A1 | 2/2017 |

OTHER PUBLICATIONS

3GPP, "3rd Generation Partnership Project; Technical Specification Group Radio Access Network; Solutions for NR to support non-terrestrial networks (NTN) (Release 16)", TR 38.821 V0.1.0, Sep. 2018.

3GPP, "3rd Generation Partnership Project; Technical Specification Group Radio Access Network; Study on New Radio (NR) to support non terrestrial networks (Release 15)", TR 38.811V1.0.0, Jun. 2018.

Thales, "Study on solutions evaluation for NR to support Non Terrestrial Network", 3GPP TSG RAN meeting #80, RP-181370, Jun. 11-14, 2018, La Jolla, USA.

\* cited by examiner

| Attributes | GEO | Non-GEO | Aerial |
|---|---|---|---|
| Beam foot print size in diameter | 200 – 1000 km | 100 – 500 km | 5 - 200 km |

FIG. 14

|  | Transparent satellite | Regenerative satellite |
|---|---|---|
| GEO based non-terrestrial access network | Scenario A | Scenario B |
| LEO based non-terrestrial access network | Scenario C | Scenario D |

FIG. 15

| Scenarios | GEO based non-terrestrial access network (Scenario A and B) | LEO based non-terrestrial access network (Scenario C & D) |
|---|---|---|
| Orbit type | notional station keeping position fixed in terms of elevation/azimuth with respect to a given earth point | circular orbiting around the earth |
| Altitude | 35,786 km | 600 km<br>1,200 km |
| Spectrum (service link) | <6 GHz (e.g. 2 GHz)<br>>6 GHz (e.g. DL 20 GHz, UL 30 GHz) | |
| Max channel bandwidth (service link) | 30 MHz for band < 6 GHz<br>400 MHz for band > 6 GHz | |
| Payload | Scenario A: Transparent (including radio frequency function only)<br>Scenario B: regenerative (including all or part of RAN functions) | Scenario C: Transparent (including radio frequency function only)<br>Scenario D: Regenerative (including all or part of RAN functions) |
| Inter-Satellite link | No | Scenario C: No<br>Scenario D: Yes |
| Earth-fixed beams | Yes | Scenario C: No (the beams move with the satellite)<br>Scenario D, option 1: Yes (steering beams), see note 1<br>Scenario D, option 2: No (the beams move with the satellite) |
| Max beam foot print diameter at nadir | 500 km | 200 km |
| Min Elevation angle for both sat-gateway and user equipment | 10° | 10° |
| Max distance between satellite and user equipment at min elevation angle | 40,586 km | 1,932 km (600 km altitude)<br>3,131 km (1,200 km altitude) |

FIG. 16

| | | |
|---|---|---|
| Max Round Trip Delay (propagation delay only) | Scenario A: 562 ms (service and feeder links) Scenario B: 281ms | Scenario C: 25.76 ms (transparent payload: service and feeder links) Scenario D: 12.88 ms (regenerative payload: service link only) |
| Max delay variation within a beam (earth fixed user equipment) | 16ms | 4.44ms (600km) 6.44ms (1200km) |
| Max differential delay within a beam | 1.6 ms | 0.65 ms (*) |
| Max Doppler shift (earth fixed user equipment) | 0.93 ppm | 24 ppm (*) |
| Max Doppler shift variation (earth fixed user equipment) | 0.000 045 ppm/s | 0.27ppm/s (*) |
| User equipment motion on the earth | 1000 km/h (e.g. aircraft) | 500 km/h (e.g. high speed train) Possibly 1000 km/h (e.g. aircraft) |
| User equipment antenna types | Omnidirectional antenna (linear polarisation), assuming 0 dBi Directive antenna (up to 60 cm equivalent aperture diameter in circular polarisation) | |
| User equipment Tx power | Omnidirectional antenna: UE power class 3 with up to 200 mW Directive antenna: up to 4 W | |
| User equipment Noise figure | Omnidirectional antenna: 7 dB Directive antenna: 1.2 dB | |
| Service link | 3GPP defined New Radio | |
| Feeder link | 3GPP or non-3GPP defined Radio interface | 3GPP or non-3GPP defined Radio interface |

FIG. 16 Cont.

ADAPTING PHY LAYER PROCEDURES FOR A MOVING RAN IN NON-TERRESTRIAL NETWORKS

CROSS REFERENCE TO RELATED APPLICATIONS

This application is a national stage application of International Patent Application No. PCT/IB2019/058531, filed Oct. 7, 2019, which claims the benefit of U.S. Provisional Application No. 62/742,897 titled "Adapting PHY Layer Procedures for a Moving RAN in Non-Terrestrial Networks," filed on Oct. 8, 2018, the disclosures of which is hereby incorporated in their entirety by reference.

TECHNICAL FIELD

The present disclosure relates generally to communication, and more particularly to operations in a non-terrestrial communication network and related nodes of the non-terrestrial communication network.

BACKGROUND

A satellite radio access network usually includes the following components: a gateway that connects satellite network to core network; at least one satellite that refers to a space-borne platform; one or more terminal, referring to user equipment; a feeder link that refers to the link between a gateway and a satellite; and a service link that refers to the link between a satellite and a terminal. The link from gateway to terminal is often called a forward link and the link from terminal to gateway is often called a return link. Depending on the functionality of the satellite in the system, there are two transponder options: bent pipe transponder and regenerative transponder. In a bent-pipe transponder system, a satellite forwards the received signal back to the earth with only amplification and a shift from uplink frequency to downlink frequency. In a regenerative transponder system, a satellite includes on-board processing to demodulate and decode the received signal and regenerate the signal before sending it back to the earth.

SUMMARY

According to some embodiments, a method of operating a wireless device that is communicating with a network node of a communications network via a non-terrestrial communication path is provided. The non-terrestrial communication path including satellites and satellite gateways. The method can include determining that communication between the wireless device and the network node will experience a communication interrupting transition during a transition period in which the non-terrestrial communication path between the wireless device and the network node will be interrupted. The method can further include adjusting a PHY layer procedure of the wireless device to mitigate switching problems with one of the satellites during and/or after the interruption.

According to some other embodiments, a method of operating a network node that is communicating with a wireless device via a non-terrestrial network is provided. The non-terrestrial network can include satellite gateways and satellites. The method can include determining that communication between the network node and the wireless device will experience a communication interruption during a transition period. The transition period can include a time period in which a communication path between the network node and the wireless device will be interrupted. The method can further include providing information to the wireless device to mitigate switching problems during and/or after the communication interruption.

According to some other embodiments, a wireless device is provided. The wireless device can include processing circuitry and memory. The memory can be coupled with the processing circuitry and include instructions that when executed by the processing circuitry causes the wireless device to perform operations. The operations can include determining that communication between the wireless device and a network node will experience a communication interrupting transition during a transition period in which a non-terrestrial communication path between the wireless device and the network node will be interrupted. The operations can further include adjusting a PHY layer procedure of the wireless device to mitigate switching problems with a satellite during and/or after the interruption.

According to some other embodiments, a network node is provided. The network node can include processing circuitry and memory. The memory can be coupled with the processing circuity and include instructions that when executed by the processing circuitry causes the network node to perform operations. The operations can include determining that communication between the network node and a wireless device will experience a communication interruption during a transition period. The transition period can include a time period in which a communication path between the network node and the wireless device will be interrupted. The operations can further include providing information to the wireless device to mitigate switching problems during and/or after the communication interruption.

Various embodiments described herein can mitigate switching problems during and/or after communication interruptions in non-terrestrial communication networks.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 14 is a table illustrating an example of a typical beam footprint size according to some embodiments of the present disclosure;

FIG. 15 is a table illustrating an example of reference scenarios according to some embodiments of the present disclosure;

FIG. 16 is a table illustrating an example of reference scenario parameters according to some embodiments of the present disclosure;

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

There is an ongoing resurgence of satellite communications. Several plans for satellite networks have been announced in the past few years. The target services vary, from backhaul and fixed wireless, to transportation, to outdoor mobile, to IoT. Satellite networks could complement mobile networks on the ground by providing connectivity to underserved areas and multicast/broadcast services. To benefit from the strong mobile ecosystem and economy of scale, adapting the terrestrial wireless access technologies including LTE and NR for satellite networks can provide significant benefits. 3GPP completed an initial study in Release 15 on adapting NR to support non-terrestrial networks (mainly satellite networks) (See TR 38.811, "Study on New Radio (NR) to support non-terrestrial networks"). This initial study focused on the channel model for the non-terrestrial networks, defining deployment scenarios, and identifying the key potential impacts. 3GPP is conducting a follow-up study item in Release 16 on solutions evaluation for NR to support non-terrestrial networks (See RP-181370, "Study on solutions evaluation for NR to support non-terrestrial networks").

Depending on the orbit altitude, a satellite may be categorized as low Earth orbit ("LEO"), medium Earth orbit ("MEO"), or geostationary ("GEO") satellite. LEO typically ranges in height from 250-1,500 km, with orbital periods ranging from 90-130 minutes. MEO has typical heights ranging from 5,000-25,000 km, with orbital periods ranging from 2-14 hours. GEO has a typical height at about 35,786 km, with an orbital period of 24 hours. FIG. 14 illustrates a table with typical beam footprint sizes.

Figure 1:
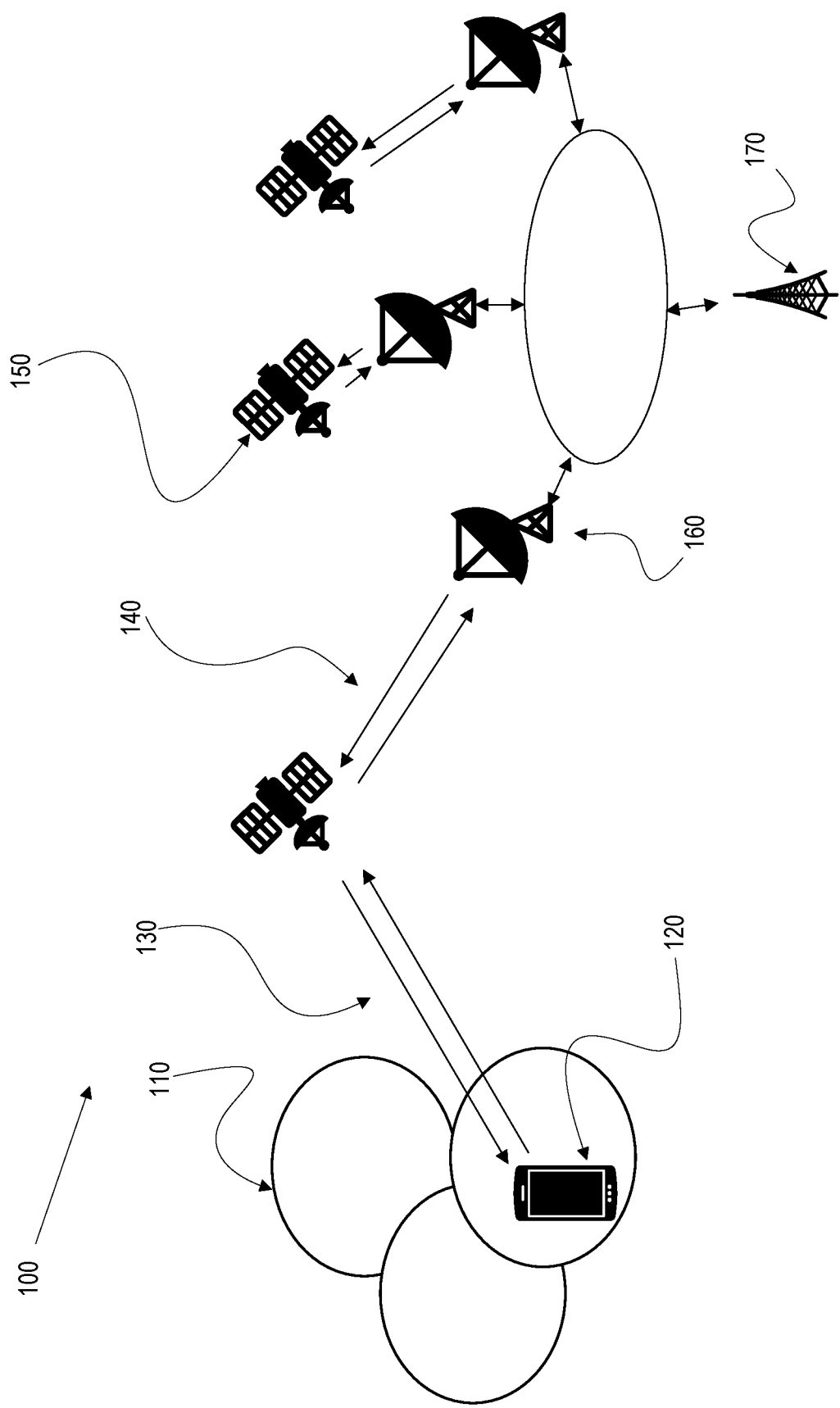
FIG. 1 is a schematic diagram illustrating an example of architecture of a satellite network with bent pipe transponders according to some embodiments of the present disclosure.

A communication satellite typically may generate several beams over a given area. The footprint of a beam is usually in an elliptic shape, which has been traditionally considered as a "cell." The footprint of a beam is also often referred to as a spotbeam. The footprint of a beam may move over the earth surface with the satellite movement or may be earth fixed with some beam pointing mechanism used by the satellite to compensate for its motion. The size of a spotbeam depends on the system design, which may range from tens of kilometers to a few thousands of kilometers. FIG. 1 shows an example of a non-terrestrial communication network ("NTN") 100. The NTN 100 includes a wireless device ("UE") 120, satellites 150, satellite gateways 160, and basestation 170. One of the satellites 150 generates cells 110, can communicate with the UE 120 via access link 130, and can communicate with one of the satellite gateways 160 via feeder link 140.

In RAN #80, a new SI "Solutions for NR to support Non Terrestrial Network" was agreed (See RP-181370, "Study on solutions evaluation for NR to support non-terrestrial networks"). It is a continuation of a preceding SI "NR to support Non-Terrestrial Networks" (RP-171450), where the objective was to study the channel model for the non-terrestrial networks, to define deployment scenarios and parameters, and to identify the key potential impacts on NR. The results are reflected in TR38.811, "Study on New Radio (NR) to support non-terrestrial networks."

The objectives of the current SI are to evaluate solutions for the identified key impacts from the preceding SI and to study impact on RAN protocols/architecture. The objectives address both the physical layer and the layer 2+ in the RAN architecture.

Consolidation of potential impacts as initially identified in TR 38.811 and identification of related solutions if needed. This may include appropriate modifications to physical layer control procedures (e.g. CSI feedback, power control), Uplink Timing advance/RACH procedure including PRACH sequence/format/message, making retransmission mechanisms at the physical layer more delay-tolerant as appropriate. This may also include capability to deactivate the HARQ mechanisms. Performance assessment of NR in selected deployment scenarios (LEO based satellite access, GEO based satellite access) through link level (Radio link) and system level (cell) simulations [RAN1].

The following aspects and identify related solutions are modified and understood as needed: propagation delay, handover, architecture, and paging. Propagation delay includes Identify timing requirements and solutions on layer 2 aspects, MAC, RLC, RRC, to support non-terrestrial network propagation delays considering FDD and TDD duplexing mode. This includes radio link management. [RAN2] Handover: Study and identify mobility requirements and necessary measurements that may be needed for handovers between some non-terrestrial space-borne vehicles (such as Non Geo stationary satellites) that move at much higher speed but over predictable paths [RAN2, RAN1] Architecture: Identify needs for the 5G's Radio Access Network architecture to support non-terrestrial networks (e.g. handling of network identities) [RAN3] Paging: procedure adaptations in case of moving satellite foot prints or cells.

Satellite or aerial vehicles typically generate several beams over a given area. The foot print of the beams are typically elliptic shape. The beam footprint may be moving over the earth with the satellite or the aerial vehicle motion on its orbit. Alternatively, the beam foot print may be earth fixed, in such case some beam pointing mechanisms (mechanical or electronic steering feature) will compensate for the satellite or the aerial vehicle motion.

Figure 2:
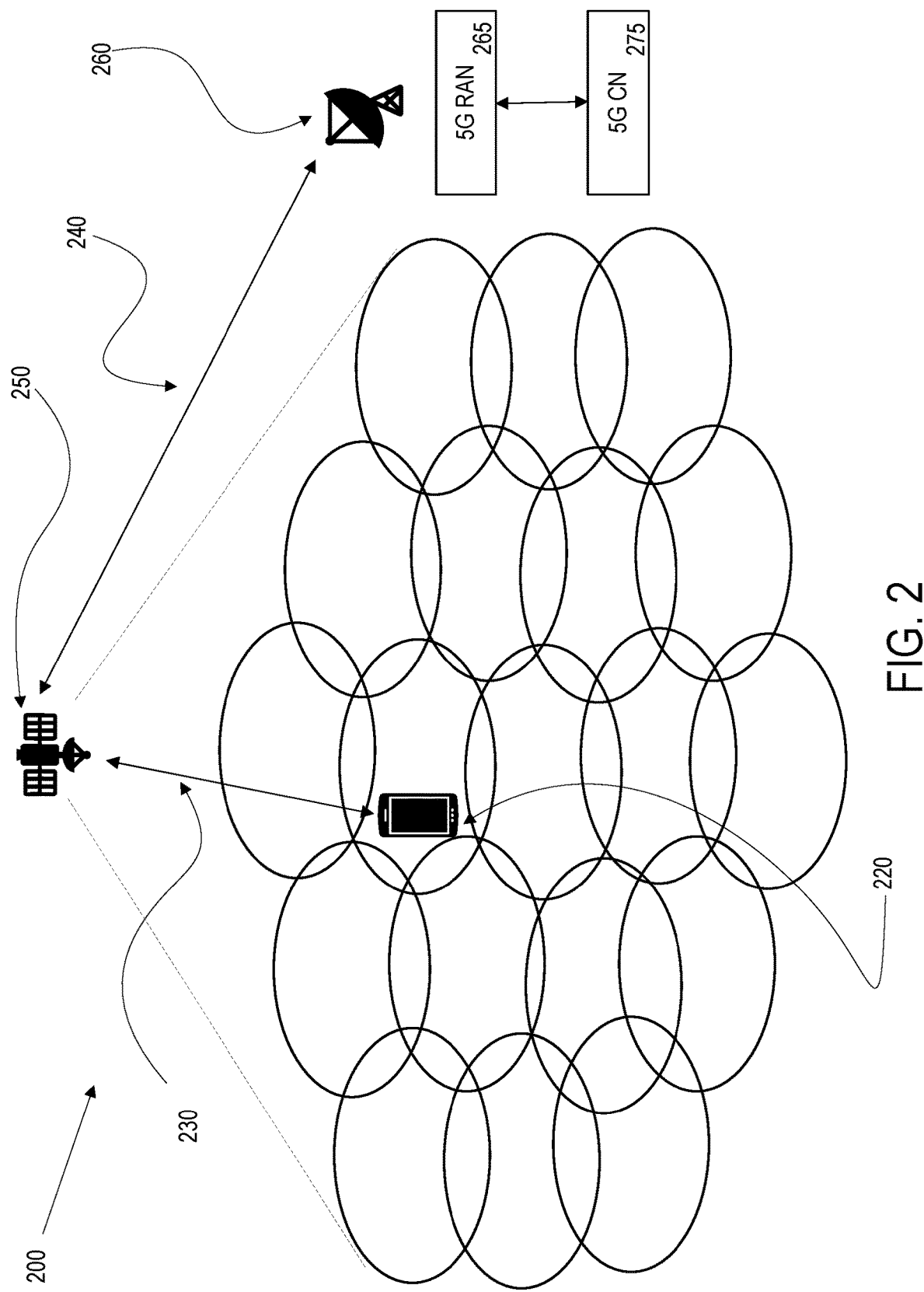
FIG. 2 is a schematic diagram illustrating an example of beam patterns of a transparent non-terrestrial network according to some embodiments of the present disclosure.

FIG. 2 illustrates a beam pattern for a transparent (bent-pipe) non-terrestrial communication network 200. The NTN 200 includes a UE 220 communicating with a satellite 250 via an access link 230. The satellite 250 communicates with a satellite gateway 260 via a feeder link 240. The NTN 200 also includes a 5G RAN node 365 and a 5G CN node 275, which are both ground network nodes that can communicate with the UE 220 via the satellite gateway 260 and satellite 250.

Figure 3:
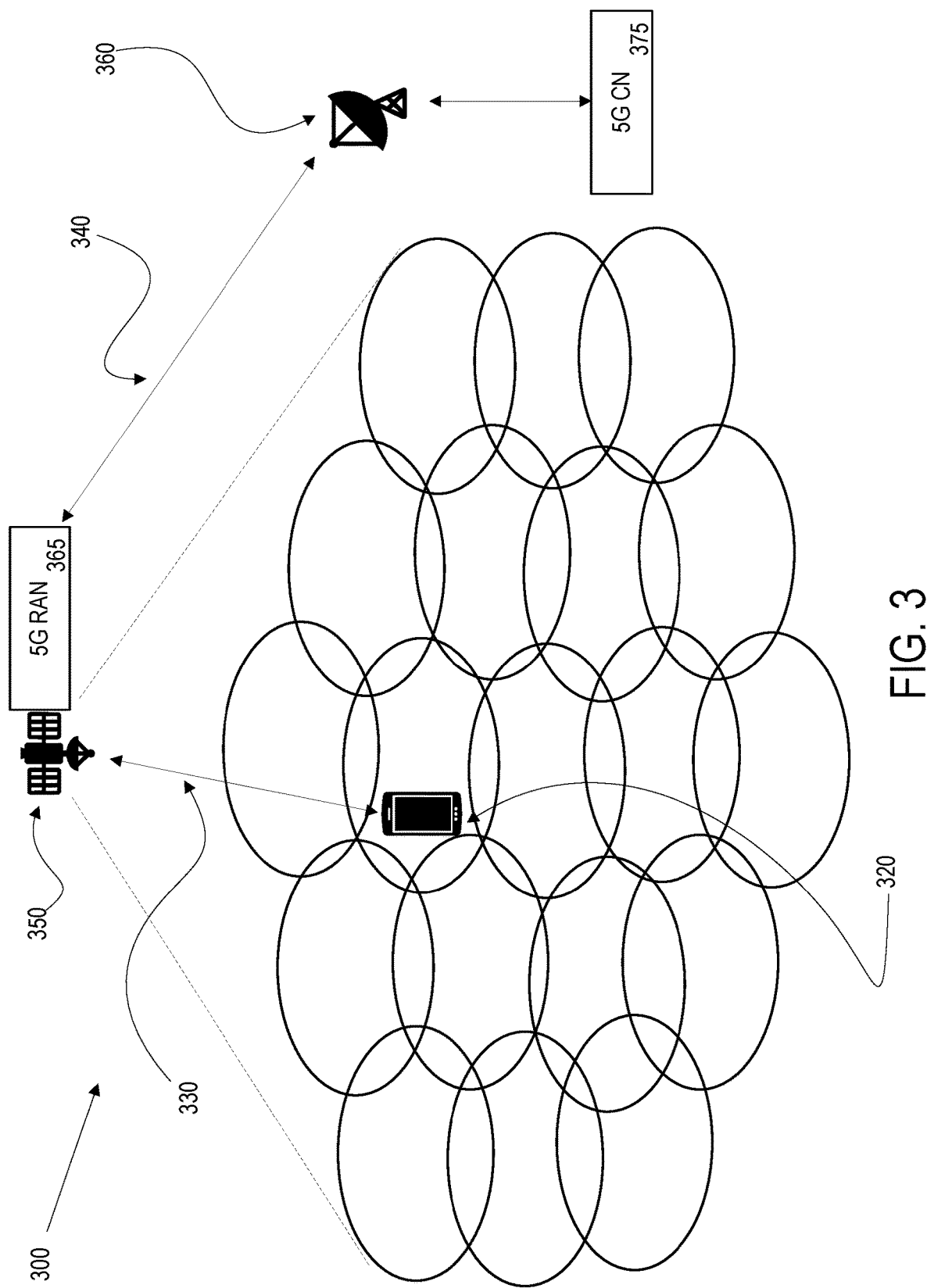
FIG. 3 is a schematic diagram illustrating an example of beam patterns of a non-transparent non-terrestrial network according to some embodiments of the present disclosure.

FIG. 3 illustrates a beam pattern for a non-transparent (on-board processor) non-terrestrial communication network 300. The NTN 300 includes a UE 320 communicating with a satellite 350 via an access link 330. The satellite 350 can include a 5G RAN node 365 that can communicate with a satellite gateway 360 via a feeder link 340. The NTN 300 also includes a 5G CN node 375, which is a ground network node that can communicate with the UE 320 via the satellite gateway 360 and satellite 350.

Non-Terrestrial Network typically features the following elements (See TR 38.821, "Study on solutions evaluation for NR to support non-terrestrial networks"): one or several satellite-gateways that connect the Non-Terrestrial Network to a public data network, and a GEO satellite that is fed by one or several sat-gateways which are deployed across the satellite targeted coverage (e.g. regional or even continental coverage). The UE in a cell is assumed to be served by only one sat-gateway. In another scenario, a non-GEO satellite may be served successively by one sat-gateway at a time. The system ensures service and feeder link continuity between the successive serving sat-gateways with sufficient time duration to proceed with mobility anchoring and handover.

Four scenarios are considered as depicted in the table in FIG. 15 and are detailed in the table in FIG. 16. (See TR 38.821, "Study on solutions evaluation for NR to support non-terrestrial networks").

It should be noted that each satellite has the capability to steer beams towards fixed points on earth using beamforming techniques. This is applicable for a period of time corresponding to the visibility time of the satellite. Additionally, a maximum delay variation within a beam (earth fixed wireless device) can be calculated based on a minimum elevation angle for both gateway and wireless device. Moreover, a maximum differential delay within a beam can be calculated based on a maximum beam foot print diameter at nadir.

For scenario D, which is LEO with regenerative payload, both earth-fixed and earth moving beams have been listed. The fixed/non-fixed beams can result in an additional scenario. The complete list of 5 scenarios in TR 38.821 is then:

Scenario A—GEO, transparent satellite, Earth-fixed beams;

Scenario B—GEO, regenerative satellite, Earth fixed beams;

Scenario C—LEO, transparent satellite, Earth-moving beams;

Scenario D1—LEO, regenerative satellite, Earth-fixed beams;

Scenario D2—LEO, regenerative satellite, Earth-moving beams.

When NR or LTE is applied to provide the connectivity via satellites, it means that the ground station is a RAN node. In the case where the satellite is transparent, all RAN functionalities are on the ground which means the sat-gateway has whole eNB/gNB functionality. For the regenerative satellite payload, part or all, of the eNB/gNB processing may be on the satellite.

Non-Geo satellites move rapidly with respect to any given UE location. As an example, on a 2-hour orbit, a LEO satellite is in view of a stationary UE from horizon to horizon for about 20 minutes. Since each LEO satellite may have many beams, the time during which a UE stays within a beam or cell is typically only a few minutes. The fast pace of satellite movement creates problems for mobile terminated reachability (i.e. paging), mobile originated reachability (i.e., random access) as well as idle and connected mode mobility (i.e., handovers) for a stationary UE as well as a moving UE. Note that the satellite mobility impacts not just the satellite-UE links but also the satellite-ground station links.

Unlike terrestrial framework where a cell on the ground is tied to radio communication with a RAN, in non-GEO satellite access network, the satellite beams may be moving. There is no fixed correspondence between cells on the ground and satellite beams. The same geographical region on the ground can be covered by different satellites and different beams over time. Basically, when one LEO satellite's beam moves away from the geographical area, another LEO satellite's beam (that may be generated by the same LEO satellite or by a neighboring LEO satellite) should come in and cover the same geographical area.

In some embodiments, it may happen that that the service link remains the same but the feeder link changes when a satellite moves out of view of one sat-gateway and into that of another sat-gateway. From the UE perspective, this means that the ground serving RAN node changes when the sat-gateway changes. This situation is not present in normal terrestrial networks.

Embodiments of the present disclosure describe potential problems and solutions using NR terminology, but it should be understood that the same solutions apply to LTE and other radio access technologies ("RATs") as well where applicable.

There currently exist certain challenge(s). Exemplary problems may arise in at least two scenarios. In the first scenario the moving RAN means essentially that the sat-gateway, which is the ground station for the satellite, switches as the satellite moves. This is illustrated in FIG. 4 where the satellite 450 is switching from a first gateway 460 to a second gateway 462.

Figure 4:
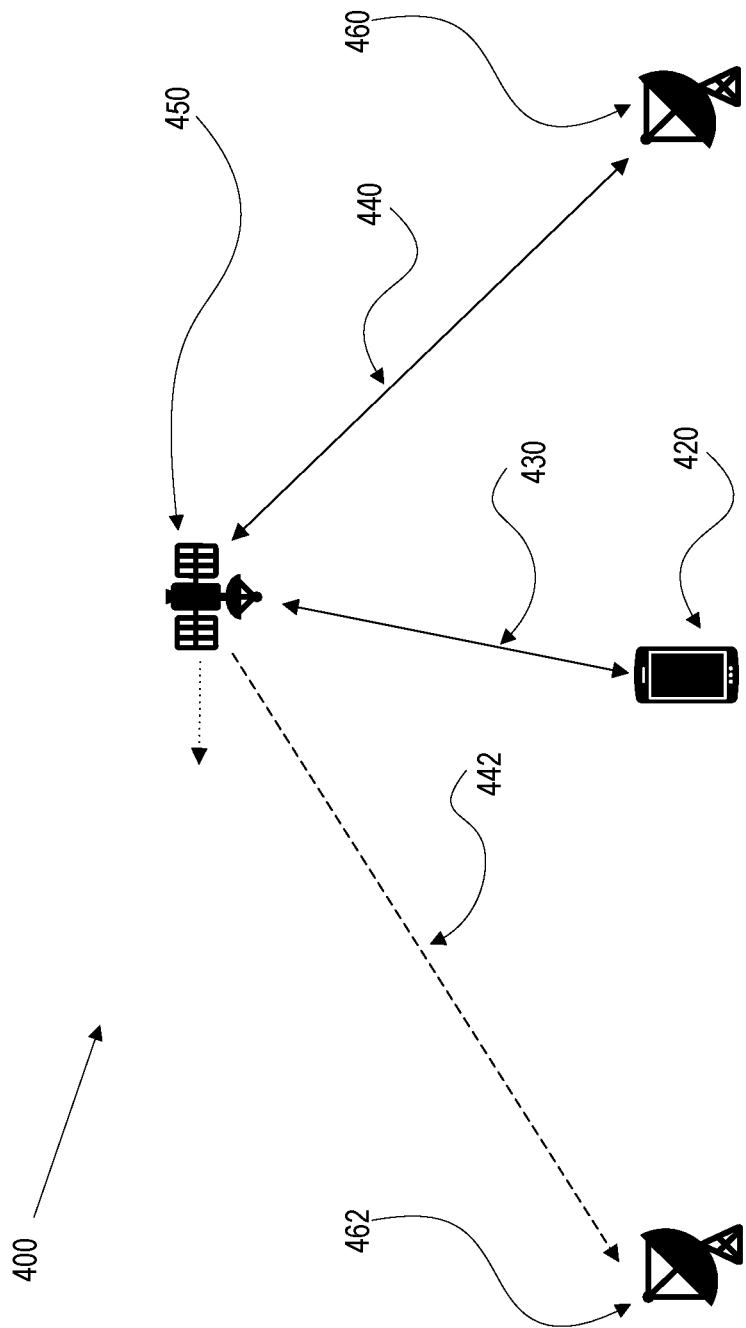
FIG. 4 is a schematic diagram illustrating an example of gateway switching according to some embodiments of the present disclosure.

FIG. 4 illustrates an NTN 400 that includes a UE 420 communicating via access link 430 to a satellite 450. The satellite 450 currently communicates with a first satellite gateway 460 via a first feeder link 440. However, the satellite 450 is moving and will eventually switch to communicating with a second satellite gateway 462 via feeder link 442.

A non-GEO satellite is served successively by one sat-gateway at a time. That means that the UE can keep the connection to the satellite, while the satellite changes the ground station. There are several issues related to the ground station switch, while for example preserving the PCI identity of the first gateway. There will be an idle period of the satellite transmission, when the satellite switches its connection from the first gateway to the second gateway. The timing advance values configured for the first gateway may need to be updated for the second gateway. In FIG. 4, access link 430 can have a distance/timing T3, first feeder link 440 can have a distance/timing T1, and feeder link 442 can have a distance timing T3. The downlink timing based on the distance T1+T3 needs to be updated based on T2+T3.

In the second scenario, the moving RAN refers to a deployment where there will be a switch in time of satellite serving a certain area, or cell. This typically happens when the currently camped-on satellite disappears beneath the horizon and a new satellite emerges as the node serving the cell.

Because of the switch of the service and/or feeder links, there may be discontinuity on the physical layer DL/UL transmission of the serving cell/UE. Proper solutions, such as those described herein, should accounted for in an efficient way at both the network and UE side.

Certain aspects of the present disclosure and their embodiments may provide solutions to these or other challenges.

In this disclosure, physical layer methods are described for addressing the issues associated with a moving RAN in NTN. In particular, embodiments are described for controlling the number of random access attempts to avoid collisions and resource wastage, network-assisted time/frequency resynchronization due to change in feeder link, robust physical (PHY) layer data transmission in wake of interruptions (network unavailability) due to RAN switch, and uplink power control following satellite switch. The embodiments include methods for adapting PHY procedures in view of a ground station and/or satellite switch. Accordingly, there are, proposed herein, various embodiments which address one or more of the issues disclosed herein.

Certain embodiments may provide one or more of the following technical advantage(s). The proposed embodiments introduce methods to support smoother switch of sat-gateways and/or satellites. An abrupt switch may cause the loss of RRC connection for UEs. As a result, the UEs may need to enter IDLE mode to start searching for new cell for which the reference signals may not be in place right away. The UEs may make the determine based on received information processed by the UE, or the UEs may be instructed directly to enter the IDLE mode. Improper adaptation may trigger a barrage of random access attempts during or following the switch. Also, since RRC connection has ended, all measurements need to be reconfigured in CONNECTED mode once the UEs find and attach to new cell. The methods and systems described herein operate to reduce concurrent uplink transmissions at a massive scale. They also attempt to reduce the signaling or power consumption or end-to-end latency.

Various embodiments described herein include methods and systems to mitigate potential problems related to a switch of ground sat-gateways. The proposed methods may also apply to the case where the satellite is also switched. The relevance and suitability may differ depending on which scenario or architecture option is in question. As described herein, the time interval during which the sat-gateway switch (e.g., feeder link switch) and/or the satellite switch (e.g., service link switch or handover) takes place, is referred to as transition period and the underlying event is referred to as transition.

Some embodiments include mitigating switching problems by initiating access barring during and or after the transition period. In one embodiment, the gNB/eNB may periodically activate access barring, tied to the anticipated handover or switching occasions, to discourage the UEs from accessing the network as the gateway or satellite is being switched. In another embodiment, access barring is activated only for certain UE classes during or following the transition period. The classes may include information regarding the mobility of the UEs or provide other important information. This may help limit the excessive random access attempts during or following the transition period. It should be noted that these access attempts may be triggered due to radio link failure or lack of synchronization because of the transition.

As an example, a massive number of UEs may be impacted due to the transition. Since such UEs cannot access the network during the transition, there may be a flood of access requests following the transition. The proposed methods and systems may help control the number of access attempts by allowing a subset of UEs to access the network while preventing or delaying other subsets of UEs in attempts to access the network. In yet an embodiment, the network uses the cell barring mechanism, or a variant thereof, to restrict access during the transition period. While access class barring acts on certain UE access classes, cell barring applies to all UEs camping on a cell.

Additional or alternative embodiments include mitigating switching problems by providing time and/or frequency resynchronization. When the service link remains the same but the feeder link changes, the required adjustment in timing advance and/or doppler frequency shifts may be common to all associated UEs. The eNB/gNB may either pre-compensate the timing/frequency or broadcast relevant information to the UEs to adjust their uplink/downlink timing or compensate for uplink/downlink doppler frequency shift. Such a solution may help avoid massive random access attempts for re-synchronization.

Additional or alternative embodiments include mitigating switching problems by initiating a transmission gap during the transition period. In non-terrestrial networks (NTNs), the duration of a switch may be much larger than that in the terrestrial case. This may interrupt an ongoing transmission, which may cause potential packet failure and/or unnecessary retransmissions. In one embodiment, new downlink control information (DCI) formats enable a configurable transmission gap during uplink or downlink data transmission. The periodicity and duration of the proposed transmission gap can be aligned with the occurrence and duration of the transition. If such a transmission gap is configured, in some embodiments, the receiver behavior may consider the received signals following the transition as a resumption of the previous transmission (unless indicated not to do so, e.g., via new data indicator (NDI) field). For example, a UE may combine the physical downlink shared channel (PDSCH) repetitions received before and after the transmission gap.

In another embodiment, the transmission gap may be indicated by repurposing existing DCI fields. Using RRC signaling, the network may communicate to the UE how to interpret new/repurposed DCI fields to set a transmission gap configuration. As an example, bandwidth limited/coverage extended (BL/CE) UEs may require several repetitions to successfully complete uplink or downlink data transmission. If a satellite gateway switch interrupts such a transmission, it may result in a packet failure. This, in turn, may trigger unnecessary retransmissions. With the proposed transmission/reception gap, the transmitter temporarily halts its transmission to resume it after the transition. Similarly, the receiver aware of the transmission gap will know when to receive and combine repetitions after the switch.

Additional or alternative embodiments include mitigating switching problems by adjusting an uplink power control. Some examples involve a satellite (service link) switch. The UE may adapt its uplink transmission power based on the coupling loss between the UE and the serving satellite. The coupling loss is commonly estimated based on reference signal received power (RSRP) measurements performed in the downlink. As the serving satellite changes so does the coupling loss. As a consequence, the UE may be programmed to dismiss its current assessment of the coupling loss; refrain from performing further uplink transmissions until a fresh coupling loss estimate has been collected, recalibrate its uplink power control once a new coupling loss estimate based on downlink RSRP measurements from the new satellite have been collected, and then resume uplink transmissions.

Figure 17:
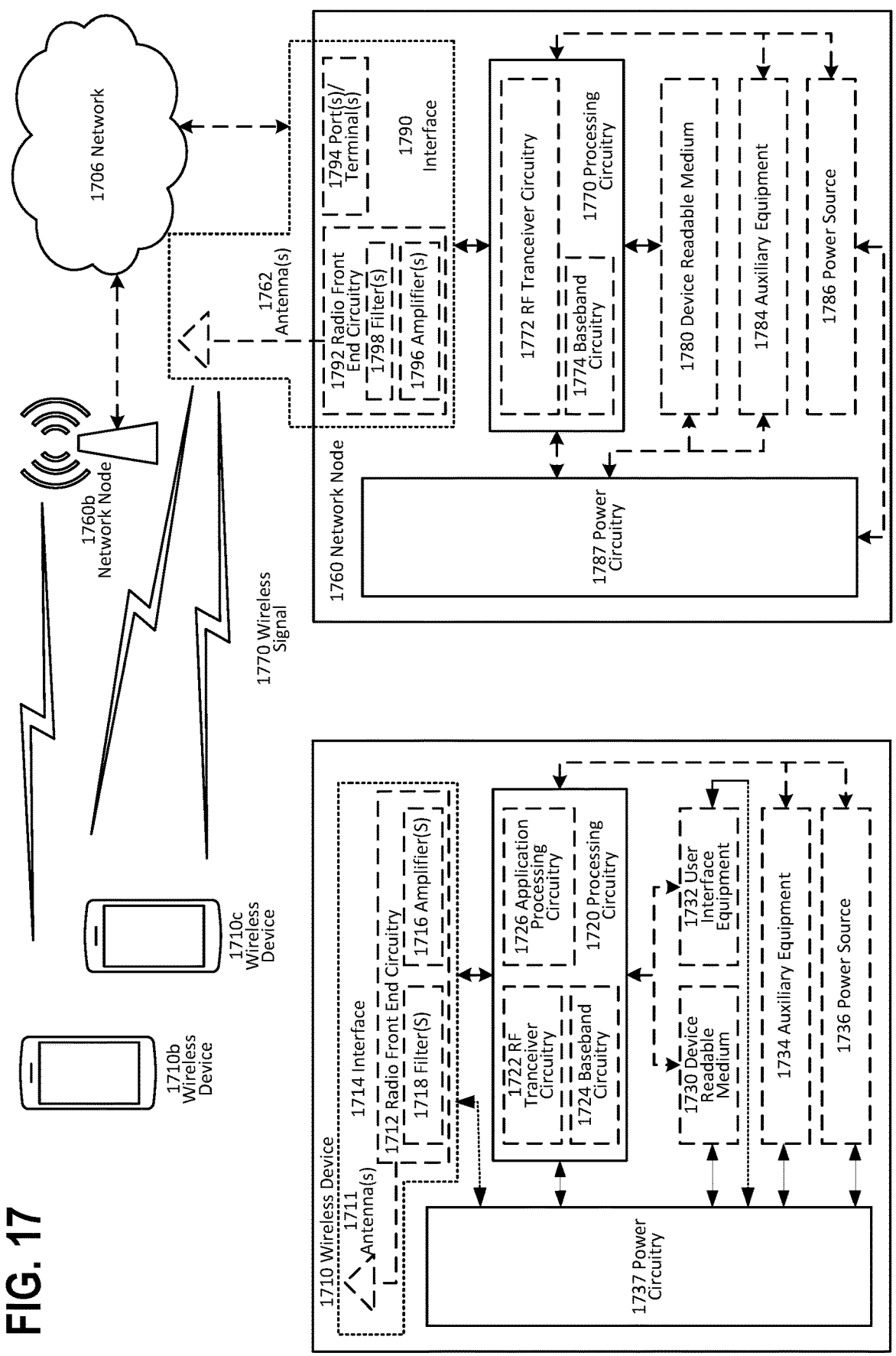
FIG. 17 is a block diagram of a wireless network in accordance with some embodiments.

Although the subject matter described herein may be implemented in any appropriate type of system using any suitable components, the embodiments disclosed herein are described in relation to a wireless network, such as the example wireless network illustrated in FIG. 17.

Figure 5:
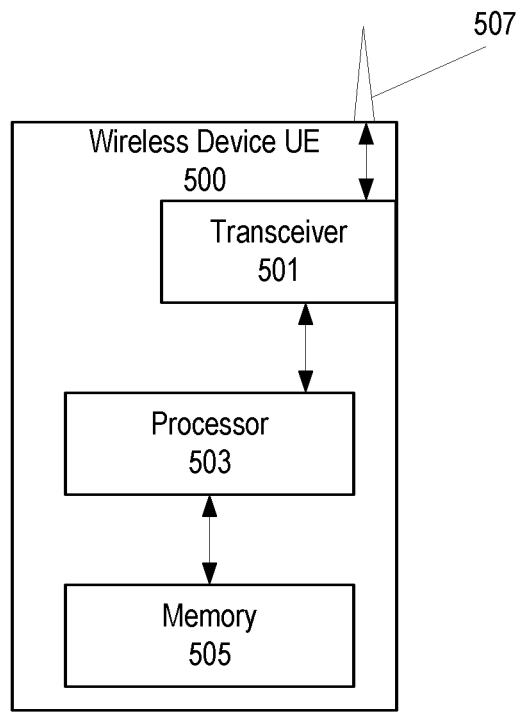
FIG. 5 is a block diagram illustrating an example of a wireless device ("UE") according to some embodiments of the present disclosure.

FIG. 5 is a block diagram illustrating elements of a wireless device UE 500 (also referred to as a mobile terminal, a mobile communication terminal, a wireless communication device, a wireless terminal, a wireless communication terminal, user equipment, UE, a user equipment node/terminal/device, etc.) configured to provide wireless communication according to embodiments of inventive concepts. (Wireless device 500 may be provided, for example, as discussed below with respect to wireless device 1710 of FIG. 17.) As shown, wireless device UE may include an antenna 507 (e.g., corresponding to antenna 1711 of FIG. 17), and transceiver circuitry 601 (also referred to as a transceiver, e.g., corresponding to interface 1714 of FIG. 17) including a transmitter and a receiver configured to provide uplink and downlink radio communications with a base station(s) (e.g., corresponding to network node 1760 of FIG. 17) of a radio access network. Wireless device UE may also include processing circuitry 503 (also referred to as a processor, e.g., corresponding to processing circuitry 1720 of FIG. 17) coupled to the transceiver circuitry, and memory circuitry 505 (also referred to as memory, e.g., corresponding to device readable medium 1730 of FIG. 17) coupled to the processing circuitry. The memory circuitry 505 may include computer readable program code that when executed by the processing circuitry 503 causes the processing circuitry to perform operations according to embodiments disclosed herein. According to other embodiments, processing circuitry 503 may be defined to include memory so that separate memory circuitry is not required. Wireless device UE may also include an interface (such as a user interface) coupled with processing circuitry 503, and/or wireless device UE may be incorporated in a vehicle.

As discussed herein, operations of wireless device UE may be performed by processing circuitry 503 and/or transceiver circuitry 501. For example, processing circuitry 503 may control transceiver circuitry 501 to transmit communications through transceiver circuitry 501 over a radio interface to a radio access network node (also referred to as a base station) and/or to receive communications through transceiver circuitry 501 from a RAN node over a radio interface. Moreover, modules may be stored in memory circuitry 505, and these modules may provide instructions so that when instructions of a module are executed by processing circuitry 503, processing circuitry 503 performs respective operations.

Figure 6:
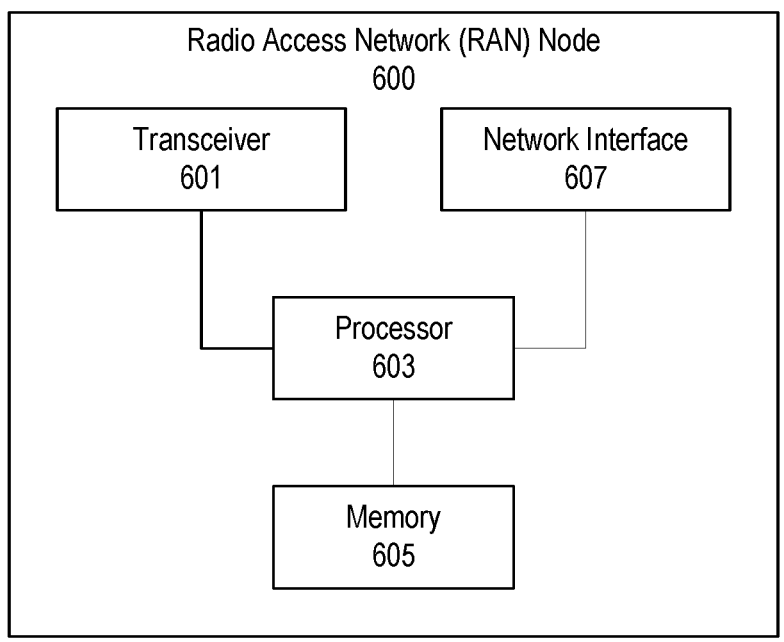
FIG. 6 is a block diagram illustrating an example of a radio access network ("RAN") node (e.g., a base station eNB/gNB) according to some embodiments of the present disclosure.

FIG. 6 is a block diagram illustrating elements of a radio access network RAN node 600 (also referred to as a network node, base station, eNodeB/eNB, gNodeB/gNB, etc.) of a Radio Access Network (RAN) configured to provide cellular communication according to embodiments of inventive concepts. (RAN node 600 may be provided, for example, as discussed below with respect to network node 1760 of FIG. 17.) As shown, the RAN node may include transceiver circuitry 601 (also referred to as a transceiver, e.g., corresponding to portions of interface 1790 of FIG. 17) including a transmitter and a receiver configured to provide uplink and downlink radio communications with mobile terminals. The RAN node may include network interface circuitry 607 (also referred to as a network interface, e.g., corresponding to portions of interface 1790 of FIG. 17) configured to provide communications with other nodes (e.g., with other base stations) of the RAN and/or core network CN. The network node may also include a processing circuitry 603 (also referred to as a processor, e.g., corresponding to processing circuitry 1770) coupled to the transceiver circuitry, and a memory circuitry 605 (also referred to as memory, e.g., corresponding to device readable medium 1780 of FIG. 17) coupled to the processing circuitry. The memory circuitry 605 may include computer readable program code that when executed by the processing circuitry 603 causes the processing circuitry to perform operations according to embodiments disclosed herein. According to other embodiments, processing circuitry 603 may be defined to include memory so that a separate memory circuitry is not required.

As discussed herein, operations of the RAN node may be performed by processing circuitry 603, network interface 607, and/or transceiver 601. For example, processing circuitry 603 may control transceiver 601 to transmit downlink communications through transceiver 601 over a radio interface to one or more mobile terminals UEs and/or to receive uplink communications through transceiver 601 from one or more mobile terminals UEs over a radio interface. Similarly, processing circuitry 603 may control network interface 607 to transmit communications through network interface 707 to one or more other network nodes and/or to receive communications through network interface from one or more other network nodes. Moreover, modules may be stored in memory 605, and these modules may provide instructions so that when instructions of a module are executed by processing circuitry 603, processing circuitry 603 performs respective operations.

According to some other embodiments, a network node may be implemented as a core network CN node without a transceiver. In such embodiments, transmission to a wireless device UE may be initiated by the network node so that transmission to the wireless device is provided through a network node including a transceiver (e.g., through a base station or RAN node). According to embodiments where the network node is a RAN node including a transceiver, initiating transmission may include transmitting through the transceiver.

Figure 7:
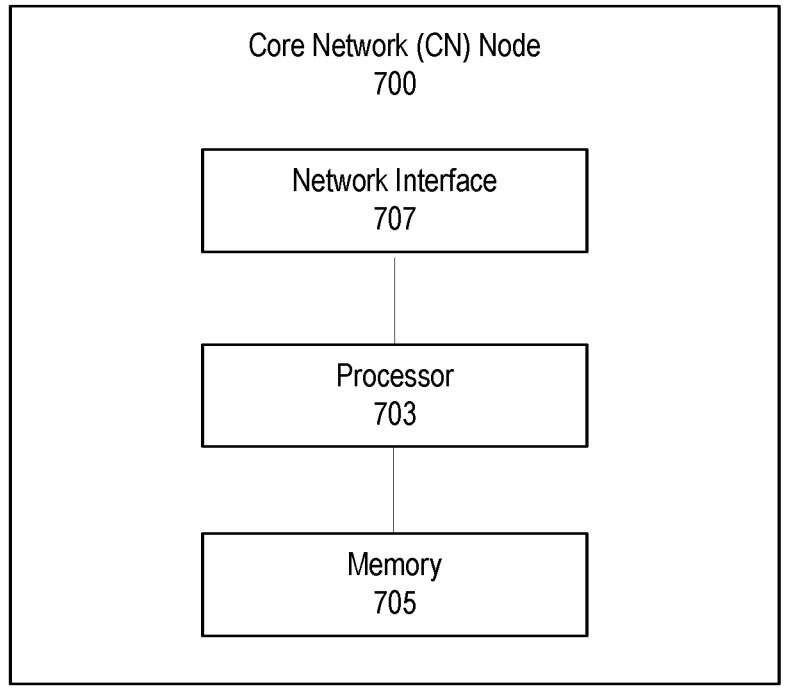
FIG. 7 is a block diagram illustrating an example of a core network ("CN") node (e.g., an AMF node, an SMF node, an OAM node, etc.) according to some embodiments of the present disclosure.

FIG. 7 is a block diagram illustrating elements of a core network CN node 700 (e.g., an SMF node, an AMF node, etc.) of a communication network configured to provide cellular communication according to embodiments of inventive concepts. As shown, the CN node 700 may include network interface circuitry 707 (also referred to as a network interface) configured to provide communications with other nodes of the core network and/or the radio access network RAN. The CN node 700 may also include a processing circuitry 703 (also referred to as a processor) coupled to the network interface circuitry, and memory circuitry 705 (also referred to as memory) coupled to the processing circuitry. The memory circuitry 705 may include computer readable program code that when executed by the processing circuitry 703 causes the processing circuitry to perform operations according to embodiments disclosed herein. According to other embodiments, processing circuitry 703 may be defined to include memory so that a separate memory circuitry is not required.

As discussed herein, operations of the CN node 700 may be performed by processing circuitry 703 and/or network interface circuitry 707. For example, processing circuitry 703 may control network interface circuitry 707 to transmit communications through network interface circuitry 707 to one or more other network nodes and/or to receive communications through network interface circuitry from one or more other network nodes. Moreover, modules may be stored in memory 705, and these modules may provide instructions so that when instructions of a module are executed by processing circuitry 703, processing circuitry 703 performs respective operations.

Figure 8:
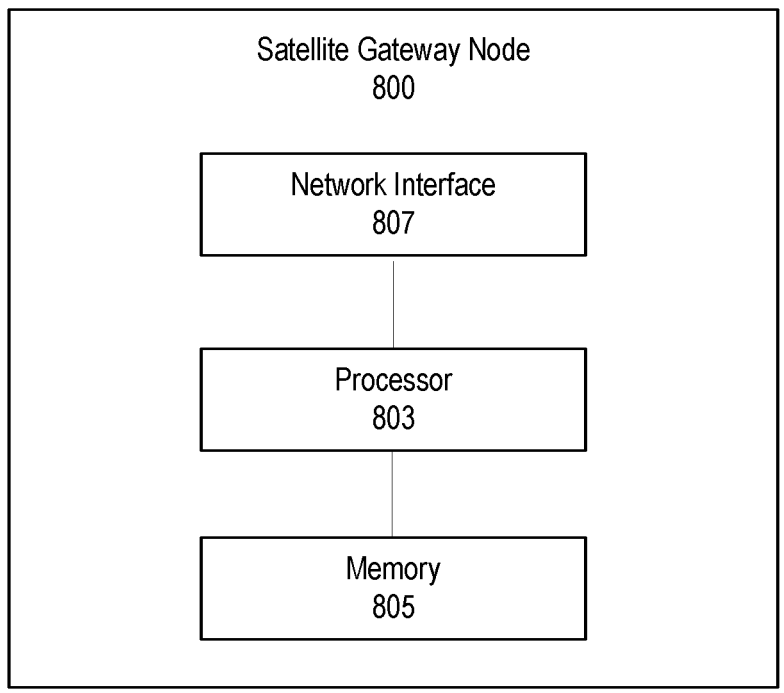
FIG. 8 is a block diagram illustrating an example of a satellite gateway node according to some embodiments of the present disclosure.

FIG. 8 is a block diagram illustrating elements of a satellite gateway node 800 of a communication network configured to provide communication according to embodiments of inventive concepts. The satellite gateway node 800 may be an example of the CN node 700. As shown, the satellite gateway node 800 may include network interface circuitry 807 (also referred to as a network interface) configured to provide communications with other nodes of the communication network include a core network and/or a radio access network ("RAN"). The satellite gateway node 800 may also include a processing circuitry 803 (also referred to as a processor) coupled to the network interface circuitry, and memory circuitry 805 (also referred to as memory) coupled to the processing circuitry. The memory circuitry 805 may include computer readable program code that when executed by the processing circuitry 803 causes the processing circuitry to perform operations according to embodiments disclosed herein. According to other embodiments, processing circuitry 803 may be defined to include memory so that a separate memory circuitry is not required.

As discussed herein, operations of the UE 500 may be performed by processing circuitry 503 and/or transceiver 501. For example, processing circuitry 503 may control transceiver 501 to transmit communications via antenna 507 to one or more network nodes and/or to receive communications via antenna 507 from one or more network nodes. Moreover, modules may be stored in memory 505, and these modules may provide instructions so that when instructions of a module are executed by processing circuitry 503, processing circuitry 503 performs respective operations.

Operations of UE 500 will now be discussed with reference to FIGS. 9-11 according to some embodiments of inventive concepts. For example, modules (also referred to as units) may be stored in memory 505 of FIG. 5, and these modules may provide instructions so that when the instructions of a module are executed by processor 503, processor 503 performs respective operations of the flow charts of FIGS. 9-11.

Figure 9:
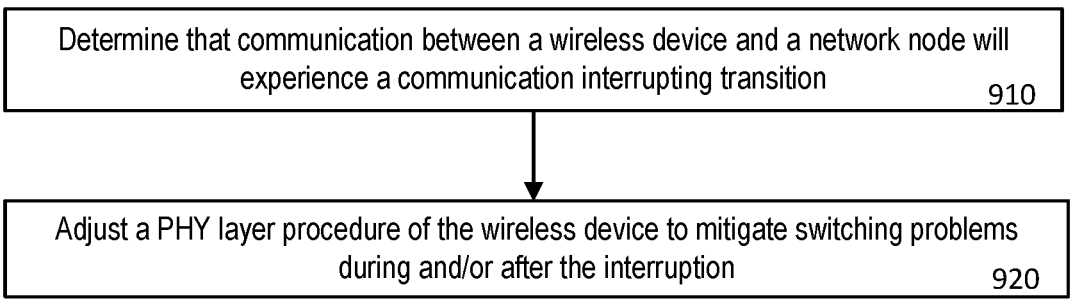
FIGS. 9-12 are flow charts illustrating example processes performed by a wireless device according to some embodiments of the present disclosure.

FIG. 9 depicts a flow chart illustrating an example of a process for operating a wireless device that is communicating with a network node of a communications network via a non-terrestrial communication path. The non-terrestrial communication path can include one or more satellites and one or more satellite gateways (e.g., satellite gateway node 800).

At block 910, processor 503 determines that communication between a wireless device and a network node will experience a communication interrupting transition. The communication interrupting transition may be during a transition period in which the non-terrestrial communication path between the wireless device and the network node will be interrupted. In some embodiments, the wireless device receives an indication that the network node has activated access barring with respect to the wireless device in anticipation of the communication interrupting transition. In some examples, thee access barring may be based on a class of the wireless device. In additional or alternative examples, the access baring may be cell barring and be based on cell of the satellite communicating with the wireless device.

At block 920, processor 503 adjusts a PHY layer procedure of the wireless device to mitigate switching problems during and/or after the interruption.

Figure 10:
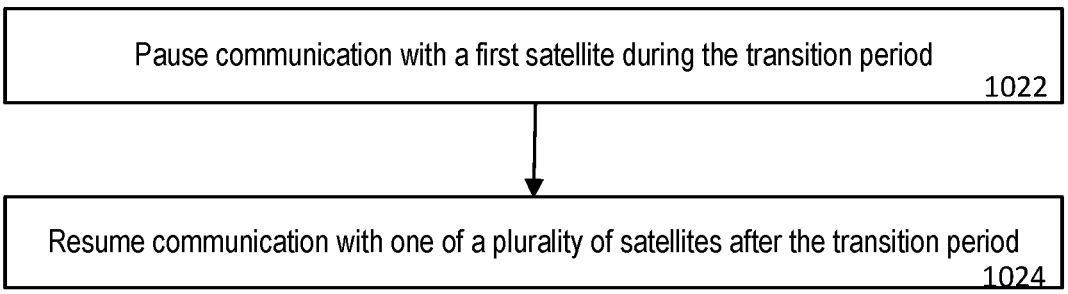

FIG. 10 depicts a flow chart illustrating a further example of the process in depicted in FIG. 9 for operating a wireless device to adjust the PHY layer procedure.

At block 1022, processor 503 pauses communication with one satellite of a plurality of satellites during the transition period.

At block 1024, processor 503 resumes communication with the one satellite of the one or more satellites after the transition period. In some embodiments, resuming communication with the one satellite includes communicating with a second satellite of the one or more satellites after the transition period, the wireless device having communicated with the one satellite of the one or more satellites prior to the transition period. In additional or alternative embodiments, the wireless device communicates with a first cell of the one satellite prior to the transition period and communicates with a second cell of the one satellite after the transition period.

Figure 11:
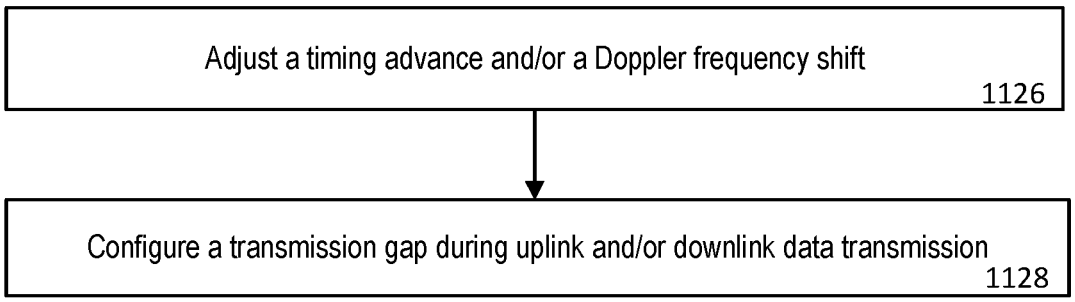

FIG. 11 depicts a flow chart illustrating a further example of the process in depicted in FIG. 9 for operating a wireless device to adjust the PHY layer procedure. In some embodiments, the wireless device adjusts the PHY layer procedure in response to receiving a message from the network node.

The message may instruct the wireless device to adjust a timing and/or a Doppler frequency shift. At block 1126, processor 503 adjusts a timing advance and/or Doppler frequency shift.

The message may include downlink control information. At block 1128, processor 503 configures a transmission gap during uplink and/or downlink data transmission. In some examples, processor 503 may configure a periodic transmission gap based on a periodic transition period. The downlink control information can include a new downlink control information format and/or a repurposed existing downlink control information field.

Figure 12:
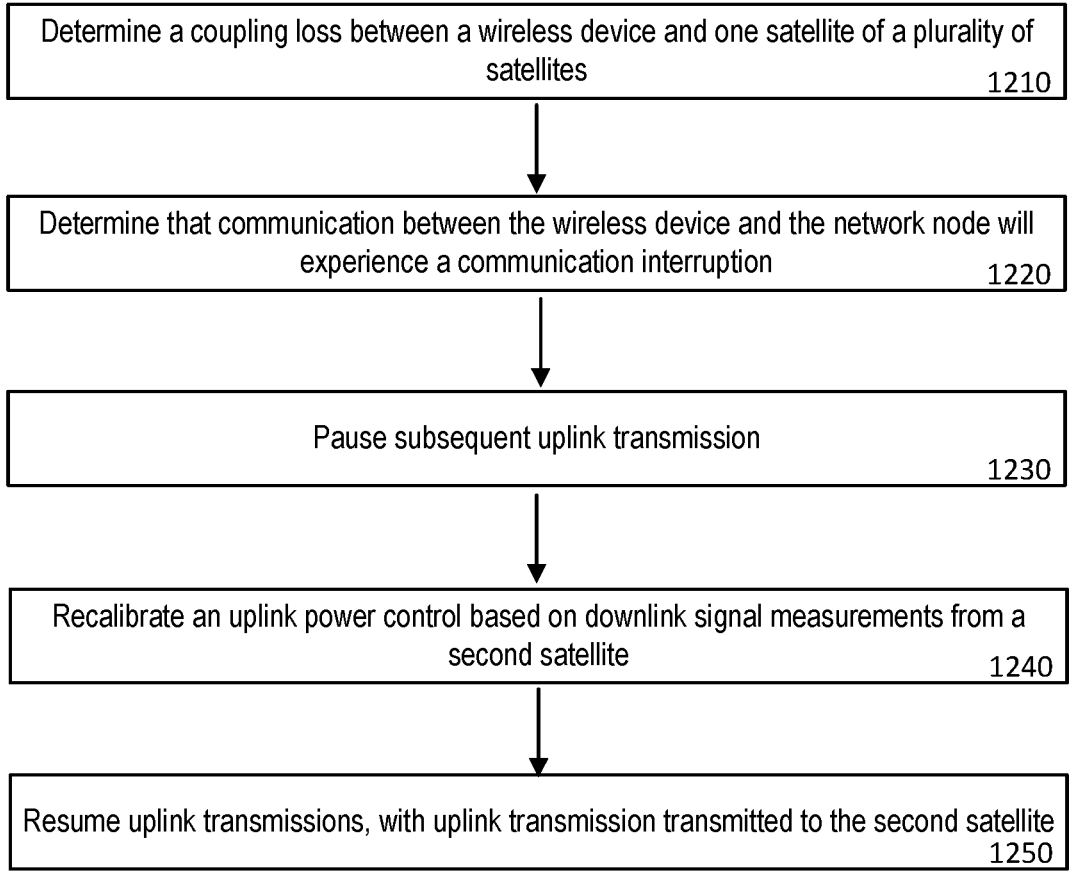

FIG. 12 depicts a flow chart illustrating a further example of the process in depicted in FIG. 9 for operating a wireless device to adjust the PHY layer procedure.

At block 1210, processor 503 determines a coupling loss between a wireless device and one satellite of a plurality of satellites.

At block 1220, processor 503 determines that communication between the wireless device and the network node will experience a communication interruption.

At block 1230, processor 503 pauses subsequent uplink transmission.

At block 1240, processor 503 recalibrates an uplink power control based on downlink signal measurements from a second satellite.

At block 1250, processor 503 resumes uplink transmissions, with uplink transmission transmitted to the second satellite.

In some embodiments, the satellites described in FIGS. 9-12 can be non-geostationary satellites and the network node can be a ground network node. In some examples, the communication path is altered in response to a first access link between the wireless device and the one satellite being switched to a second access link between the wireless device and a second satellite. In additional or alternative examples, the communication path is altered in response to a first feeder link between the one satellite and a first satellite gateway being switched to a second feeder link between the one satellite and a second satellite gateway. Various operations of FIGS. 9-12 may be optional with respect to some embodiments.

Operations of network node 700 will now be discussed with reference to FIG. 13 according to some embodiments of inventive concepts. For example, modules (also referred to as units) may be stored in memory 705 of FIG. 7, and these modules may provide instructions so that when the instructions of a module are executed by processor 703, processor 703 performs respective operations of the flow chart of FIG. 13.

Figure 13:
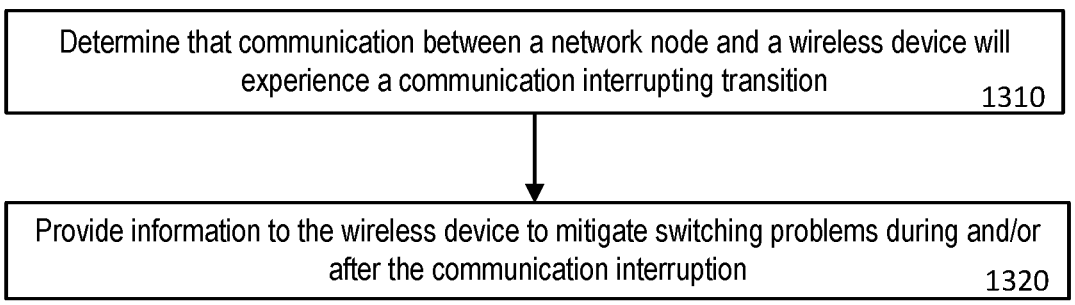
FIG. 13 is a flow chart illustrating an example process performed by a network node according to some embodiments of the present disclosure.

FIG. 13 depicts a flow chart illustrating an example of a process for a network node that is communicating with a wireless device via a non-terrestrial network. The non-terrestrial network can include one or more satellite gateways and one or more satellites. Although the process of FIG. 13 is described below in reference to the CN node 700, the process may be performed by any suitable network node (e.g., RAN node 600 or satellite gateway node 800).

At block 1310, processor 703 determines that communication between a network node and a wireless device will experience a communication interrupting transition. The transition period can include a time period in which a communication path between the network node and the wireless device will be interrupted. In some embodiments, processor 703 receives velocity information from the wireless device. The velocity information including a speed and a direction of movement of the wireless device. Processor 703 can also receive velocity information for the one of the plurality of satellites. Processor 703 can determine the transition period based on the received velocity information for the wireless device and/or the received velocity information for the one on the plurality of satellites.

In some embodiments, the communication path will be altered during the transition period by one of: a transition from one satellite of the plurality of satellites to a second satellite of the plurality of satellites; a transition from a first cell of the one satellite to a second cell of the one satellite; and a transition in communication between the one satellite and a first satellite gateway of the plurality of satellite gateways and a second satellite gateway of the plurality of satellites gateways, wherein the first and second satellite gateways are provided by terrestrial network nodes.

At block 1320, processor 703 provides information to the wireless device to mitigate switching problems during the communication interruption. In some embodiments, processor 703 determines the time period of the transition period associated with the wireless device and one of the satellites. Providing the information to the wireless device includes providing instructions to pause communication with the one of the plurality of satellites during the time period.

In some embodiments, the network node is a ground network node. In additional or alternative embodiments, the network node is a basestation in a 5G communication network.

Although the processes illustrated in FIG. 13 are described as being performed by the processor 703 of CN node 700, the processes may be performed by any suitable network node in the non-terrestrial network. Furthermore, various operations of FIG. 13 may be optional with respect to some embodiments.

Example Embodiments are discussed below. Reference numbers/letters are provided in parenthesis by way of example/illustration without limiting example embodiments to particular elements indicated by reference numbers/letters.

Embodiment 1: A method of operating a wireless device that is communicating with a network node of a communications network via a non-terrestrial communication path. The non-terrestrial path including a plurality of satellites and a plurality of satellite gateways. The method can include determining that communication between the wireless device and the network node will experience a communication interrupting transition during a transition period in which the non-terrestrial communication path between the wireless device and the network node will be interrupted. The method can further include adjusting a PHY layer procedure of the wireless device to mitigate switching problems with one of the plurality of satellites during and/or after the interruption.

Embodiment 2: The method of Embodiment 1, wherein adjusting the PHY layer procedure includes pausing communication with the one of the plurality of satellites during the transition period and resuming communication with the one of the plurality of satellites after the transition period.

Embodiment 3: The method of Embodiment 2, wherein resuming communication with the one of the plurality of satellites after the transition period includes communicating with a second satellite of the plurality of satellites after the transition period. The wireless device may have communicated with the one satellite of the plurality of satellites prior to the transition period.

Embodiment 4: The method of Embodiment 2, further including communicating with a first cell of the one satellite of the plurality of satellites prior to the transition period. The method further including resuming communication with the one of the plurality of satellites after the transition comprises communicating with a second cell of the one satellite of the plurality of satellites after the transition period.

Embodiment 5: The method of any of Embodiments 2-4, wherein determining that the communication between the wireless device and the network node will experience a communication interrupting transition includes receiving an indication that the network node of the communications network has activated access barring with respect to the wireless device in anticipation of the communication interrupting transition.

Embodiment 6: The method of Embodiment 5, wherein the network node activates access barring based on a class of the wireless device.

Embodiment 7: The method of Embodiment 5, wherein the network node activates access barring based on a cell of the one of the plurality of satellites, wherein the wireless device communicates with the cell.

Embodiment 8: The method of any of Embodiments 1-7, further including receiving a message from the network node of the communications network. The message can instruct the wireless device to adjust a timing advance and/or a Doppler frequency shift. Adjusting a PHY layer procedure can include adjusting the timing advance and/or the Doppler frequency shift in response to the message from the network node.

Embodiment 9: The method of any of Embodiments 1-8, further including receiving downlink control information from the network node in the communications network. Adjusting a PHY layer procedure can include configuring a transmission gap during uplink and/or downlink data transmission, the transmission gap being greater than or equal to the transition period.

Embodiment 10: The method of Embodiment 9, wherein adjusting the PHY layer procedure can include configuring a plurality of periodic transmission gaps based on a plurality of periodic transition periods. The plurality of periodic transmission gaps can include the transmission gap and the plurality of periodic transition periods comprises the transition period.

Embodiment 11: The method of Embodiment 9, wherein the downlink control information includes a new downlink control information format and/or a repurposed existing downlink control information field.

Embodiment 12: The method of any of Embodiments 1-11, wherein determining that the communication between the wireless device and the network node will experience the communication interrupting transition during the transition period includes determining a coupling loss between the wireless device and the one of the plurality of satellites and determining that the communication between the wireless device and the network node will experience the communication interruption. Adjusting the PHY layer procedures can include adapting an uplink transmission power of the wireless device based on the coupling loss between the wireless device and the one of the plurality of satellites.

Embodiment 13: The method of any of Embodiments 1-12, wherein adjusting the PHY layer procedures can include: ignoring a current coupling loss estimate; pausing subsequent uplink transmissions until a new coupling loss estimate has been determined; recalibrating an uplink power control based on downlink signal measurements from a second satellite of the plurality of satellites; and resuming uplink transmissions, wherein the uplink transmissions are sent to the second satellite instead of the one satellite of the plurality of satellites.

Embodiment 14: The method of any of Embodiments 1-13, wherein the plurality of satellites are non-geostationary satellites. The network node can be a ground network node.

Embodiment 15: The method of any of Embodiments 1-14, wherein the communication path is altered in response to a first access link between the wireless device and the one satellite of the plurality of satellites being switched to a second access link between the wireless device and a second satellite.

Embodiment 16: The method of any of Embodiments 1-15, wherein the communication path is altered in response to a first feeder link between the first satellite and a first satellite gateway being switched to a second feeder link between the first satellite and a second satellite gateway.

Embodiment 17: A method of operating a network node that is communicating with a wireless device via a non-terrestrial network. The non-terrestrial network can include a plurality of satellite gateways and a plurality of satellites. The method can include determining that communication between the network node and the wireless device will experience a communication interruption during a transition period. The transition period can include a time period in which a communication path between the network node and the wireless device will be interrupted. The method can further include providing information to the wireless device to mitigate switching problems during and/or after the communication interruption.

Embodiment 18: The method of Embodiment 17, further including determining the time period of the transition period associated with the wireless device and one of the plurality of satellites. Providing the information to the wireless device can include providing instructions to pause communication with the one of the plurality of satellites during the time period.

Embodiment 19: The method of any of Embodiments 17-18, further including receiving velocity information from the wireless device, the velocity information including a speed and a direction of movement of the wireless device and receiving velocity information for the one of the plurality of satellites. The transition period can be determined based on the received velocity information for the wireless device and/or the received velocity information for the one of the plurality of satellites.

Embodiment 20: The method of any of Embodiments 17-19, wherein the communication path will be altered during the transition period by one of: a transition from the one satellite of the plurality of satellites to a second satellite of the plurality of satellites; a transition from a first cell of the one satellite to a second cell of the first satellite; and a transition in communication between the one satellite and a first satellite gateway of the plurality of satellite gateways and a second satellite gateway of the plurality of satellites gateways. The first and second satellite gateways are provided by terrestrial network nodes.

Embodiment 21: The method of any of Embodiments 17-20, wherein the network node is a ground network node.

Embodiment 22: The method of any of Embodiments 17-21, wherein the network node is a base station in a 5G communications network.

Embodiment 23: A wireless device operable to communicate with a network node of a communications network via a non-terrestrial communication path. The non-terrestrial communication path includes one of a plurality of satellites and one of a plurality of satellite gateways. The wireless device includes processing circuitry and memory coupled with the processing circuitry. The memory includes instructions that when executed by the processing circuitry causes the wireless device to perform operations according to any of Embodiments 1-16.

Embodiment 24: A network node operable to communicate with a wireless device via a non-terrestrial network. The non-terrestrial network can include one of a plurality of satellite gateways and one of a plurality of satellites. The network node can include processing circuitry and memory coupled with the processing circuitry. The memory includes instructions that when executed by the processing circuitry causes the wireless device to perform operations according to any of Embodiments 17-22.

Embodiment 25: A computer program including program code to be executed by processing circuitry of a wireless device operable to communicate with a network node of a communications network via a non-terrestrial communication path. The non-terrestrial communication path can include one of a plurality of satellites and one of a plurality of satellite gateways. Execution of the program code causes the wireless device to perform operations according to any of Embodiments 1-16.

Embodiment 26: A computer program including program code to be executed by processing circuitry of a network node operable to communicate with a wireless device via a non-terrestrial network. The non-terrestrial network includes one of a plurality of satellite gateways and one of a plurality of satellites. Execution of the program code causes the network node to perform operations according to any of Embodiments 17-22.

Explanations for abbreviations from the above disclosure are provided below.

BS Base Rotation
BL/CE Bandwidth Limited/Coverage Extended
DRX Discontinuous Reception
GEO Geostationary Orbit
GPS Global Positioning System
GW Gateway
LEO Low Earth Orbit
MEO Medium Earth Orbit
Msg1 Message 1
Msg2 Message 2
Msg3 Message 3
Msg4 Message 4
NGSO Non-Geostationary Orbit
RTT Round-Trip Time
SR Scheduling Requests
TA Timing Advance
1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment/Wireless Device
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network Full citations for references made in this application are provided below:

[1] TR 38.811, Study on New Radio (NR) to support non-terrestrial networks
[2] RP-181370, Study on solutions evaluation for NR to support non-terrestrial networks
[3] TR 38.821, Study on solutions evaluation for NR to support non-terrestrial networks Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components, or functions but does not preclude the presence or addition of one or more other features, integers, elements, steps, components, functions, or groups thereof. Furthermore, as used herein, the common abbreviation "e.g.", which derives from the Latin phrase "exempli gratia," may be used to introduce or specify a general example or examples of a previously mentioned item and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description. Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Although the subject matter described herein may be implemented in any appropriate type of system using any suitable components, the embodiments disclosed herein are described in relation to a wireless network, such as the example wireless network illustrated in FIG. 17. For simplicity, the wireless network of FIG. 17 only depicts network 1706, network nodes 1760 and 1760b, and WDs 1710, 1710b, and 1710c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 1760 and wireless device (WD) 1710 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1706 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1760 and WD 1710 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 17, network node 1760 includes processing circuitry 1770, device readable medium 1780, interface 1790, auxiliary equipment 1784, power source 1786, power circuitry 1787, and antenna 1762. Although network node 1760 illustrated in the example wireless network of FIG. 17 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1760 are depicted as single boxes located within a larger box, or nested within multiple boxes, in practice, a network node may comprise multiple different physical components that make up a single illustrated component (e.g., device readable medium 1780 may comprise multiple separate hard drives as well as multiple RAM modules).

Similarly, network node 1760 may be composed of multiple physically separate components (e.g., a NodeB component and a RNC component, or a BTS component and a BSC component, etc.), which may each have their own respective components. In certain scenarios in which network node 1760 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1760 may be configured to support multiple radio access technologies (RATs). In such embodiments, some components may be duplicated (e.g., separate device readable medium 1780 for the different RATs) and some components may be reused (e.g., the same antenna 1762 may be shared by the RATs). Network node 1760 may also include multiple sets of the various illustrated components for different wireless technologies integrated into network node 1760, such as, for example, GSM, WCDMA, LTE, NR, WiFi, or Bluetooth wireless technologies. These wireless technologies may be integrated into the same or different chip or set of chips and other components within network node 1760.

Processing circuitry 1770 is configured to perform any determining, calculating, or similar operations (e.g., certain obtaining operations) described herein as being provided by a network node. These operations performed by processing circuitry 1770 may include processing information obtained by processing circuitry 1770 by, for example, converting the obtained information into other information, comparing the obtained information or converted information to information stored in the network node, and/or performing one or more operations based on the obtained information or converted information, and as a result of said processing making a determination.

Processing circuitry 1770 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1760 components, such as device readable medium 1780, network node 1760 functionality. For example, processing circuitry 1770 may execute instructions stored in device readable medium 1780 or in memory within processing circuitry 1770. Such functionality may include providing any of the various wireless features, functions, or benefits discussed herein. In some embodiments, processing circuitry 1770 may include a system on a chip (SOC).

In some embodiments, processing circuitry 1770 may include one or more of radio frequency (RF) transceiver circuitry 1772 and baseband processing circuitry 1774. In some embodiments, radio frequency (RF) transceiver circuitry 1772 and baseband processing circuitry 1774 may be on separate chips (or sets of chips), boards, or units, such as radio units and digital units. In alternative embodiments, part or all of RF transceiver circuitry 1772 and baseband processing circuitry 1774 may be on the same chip or set of chips, boards, or units.

In certain embodiments, some or all of the functionality described herein as being provided by a network node, base station, eNB or other such network device may be performed by processing circuitry 1770 executing instructions stored on device readable medium 1780 or memory within processing circuitry 1770. In alternative embodiments, some or all of the functionality may be provided by processing circuitry 1770 without executing instructions stored on a separate or discrete device readable medium, such as in a hard-wired manner In any of those embodiments, whether executing instructions stored on a device readable storage medium or not, processing circuitry 1770 can be configured to perform the described functionality. The benefits provided by such functionality are not limited to processing circuitry 1770 alone or to other components of network node 1760, but are enjoyed by network node 1760 as a whole, and/or by end users and the wireless network generally.

Device readable medium 1780 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1770. Device readable medium 1780 may store any suitable instructions, data or information, including a computer program, software, an application including one or more of logic, rules, code, tables, etc. and/or other instructions capable of being executed by processing circuitry 1770 and, utilized by network node 1760. Device readable medium 1780 may be used to store any calculations made by processing circuitry

1770 and/or any data received via interface 1790. In some embodiments, processing circuitry 1770 and device readable medium 1780 may be considered to be integrated.

Interface 1790 is used in the wired or wireless communication of signalling and/or data between network node 1760, network 1706, and/or WDs 1710. As illustrated, interface 1790 comprises port(s)/terminal(s) 1794 to send and receive data, for example to and from network 1706 over a wired connection. Interface 1790 also includes radio front end circuitry 1792 that may be coupled to, or in certain embodiments a part of, antenna 1762. Radio front end circuitry 1792 comprises filters 1798 and amplifiers 1796. Radio front end circuitry 1792 may be connected to antenna 1762 and processing circuitry 1770. Radio front end circuitry may be configured to condition signals communicated between antenna 1762 and processing circuitry 1770. Radio front end circuitry 1792 may receive digital data that is to be sent out to other network nodes or WDs via a wireless connection. Radio front end circuitry 1792 may convert the digital data into a radio signal having the appropriate channel and bandwidth parameters using a combination of filters 1798 and/or amplifiers 1796. The radio signal may then be transmitted via antenna 1762. Similarly, when receiving data, antenna 1762 may collect radio signals which are then converted into digital data by radio front end circuitry 1792. The digital data may be passed to processing circuitry 1770. In other embodiments, the interface may comprise different components and/or different combinations of components.

In certain alternative embodiments, network node 1760 may not include separate radio front end circuitry 1792, instead, processing circuitry 1770 may comprise radio front end circuitry and may be connected to antenna 1762 without separate radio front end circuitry 1792. Similarly, in some embodiments, all or some of RF transceiver circuitry 1772 may be considered a part of interface 1790. In still other embodiments, interface 1790 may include one or more ports or terminals 1794, radio front end circuitry 1792, and RF transceiver circuitry 1772, as part of a radio unit (not shown), and interface 1790 may communicate with baseband processing circuitry 1774, which is part of a digital unit (not shown).

Antenna 1762 may include one or more antennas, or antenna arrays, configured to send and/or receive wireless signals. Antenna 1762 may be coupled to radio front end circuitry 1790 and may be any type of antenna capable of transmitting and receiving data and/or signals wirelessly. In some embodiments, antenna 1762 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1762 may be separate from network node 1760 and may be connectable to network node 1760 through an interface or port.

Antenna 1762, interface 1790, and/or processing circuitry 1770 may be configured to perform any receiving operations and/or certain obtaining operations described herein as being performed by a network node. Any information, data and/or signals may be received from a wireless device, another network node and/or any other network equipment. Similarly, antenna 1762, interface 1790, and/or processing circuitry 1770 may be configured to perform any transmitting operations described herein as being performed by a network node. Any information, data and/or signals may be transmitted to a wireless device, another network node and/or any other network equipment.

Power circuitry 1787 may comprise, or be coupled to, power management circuitry and is configured to supply the components of network node 1760 with power for performing the functionality described herein. Power circuitry 1787 may receive power from power source 1786. Power source 1786 and/or power circuitry 1787 may be configured to provide power to the various components of network node 1760 in a form suitable for the respective components (e.g., at a voltage and current level needed for each respective component). Power source 1786 may either be included in, or external to, power circuitry 1787 and/or network node 1760. For example, network node 1760 may be connectable to an external power source (e.g., an electricity outlet) via an input circuitry or interface such as an electrical cable, whereby the external power source supplies power to power circuitry 1787. As a further example, power source 1786 may comprise a source of power in the form of a battery or battery pack which is connected to, or integrated in, power circuitry 1787. The battery may provide backup power should the external power source fail. Other types of power sources, such as photovoltaic devices, may also be used.

Alternative embodiments of network node 1760 may include additional components beyond those shown in FIG. 17 that may be responsible for providing certain aspects of the network node's functionality, including any of the functionality described herein and/or any functionality necessary to support the subject matter described herein. For example, network node 1760 may include user interface equipment to allow input of information into network node 1760 and to allow output of information from network node 1760. This may allow a user to perform diagnostic, maintenance, repair, and other administrative functions for network node 1760.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal As illustrated, wireless device 1710 includes antenna 1711, interface 1714, processing circuitry 1720, device readable medium 1730, user interface equipment 1732, auxiliary equipment 1734, power source 1736 and power circuitry 1737. WD 1710 may include multiple sets of one or more of the illustrated components for different wireless technologies supported by WD 1710, such as, for example, GSM, WCDMA, LTE, NR, WiFi, WiMAX, or Bluetooth wireless technologies, just to mention a few. These wireless technologies may be integrated into the same or different chips or set of chips as other components within WD 1710.

Antenna 1711 may include one or more antennas or antenna arrays, configured to send and/or receive wireless signals, and is connected to interface 1714. In certain alternative embodiments, antenna 1711 may be separate from WD 1710 and be connectable to WD 1710 through an interface or port. Antenna 1711, interface 1714, and/or processing circuitry 1720 may be configured to perform any receiving or transmitting operations described herein as being performed by a WD. Any information, data and/or signals may be received from a network node and/or another WD. In some embodiments, radio front end circuitry and/or antenna 1711 may be considered an interface.

As illustrated, interface 1714 comprises radio front end circuitry 1712 and antenna 1711. Radio front end circuitry 1712 comprise one or more filters 1718 and amplifiers 1716. Radio front end circuitry 1714 is connected to antenna 1711 and processing circuitry 1720, and is configured to condition signals communicated between antenna 1711 and processing circuitry 1720. Radio front end circuitry 1712 may be coupled to or a part of antenna 1711. In some embodiments, WD 1710 may not include separate radio front end circuitry 1712; rather, processing circuitry 1720 may comprise radio front end circuitry and may be connected to antenna 1711. Similarly, in some embodiments, some or all of RF transceiver circuitry 1722 may be considered a part of interface 1714. Radio front end circuitry 1712 may receive digital data that is to be sent out to other network nodes or WDs via a wireless connection. Radio front end circuitry 1712 may convert the digital data into a radio signal having the appropriate channel and bandwidth parameters using a combination of filters 1718 and/or amplifiers 1716. The radio signal may then be transmitted via antenna 1711. Similarly, when receiving data, antenna 1711 may collect radio signals which are then converted into digital data by radio front end circuitry 1712. The digital data may be passed to processing circuitry 1720. In other embodiments, the interface may comprise different components and/or different combinations of components.

Processing circuitry 1720 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1710 components, such as device readable medium 1730, WD 1710 functionality. Such functionality may include providing any of the various wireless features or benefits discussed herein. For example, processing circuitry 1720 may execute instructions stored in device readable medium 1730 or in memory within processing circuitry 1720 to provide the functionality disclosed herein.

As illustrated, processing circuitry 1720 includes one or more of RF transceiver circuitry 1722, baseband processing circuitry 1724, and application processing circuitry 1726. In other embodiments, the processing circuitry may comprise different components and/or different combinations of components. In certain embodiments processing circuitry 1720 of WD 1710 may comprise a SOC. In some embodiments, RF transceiver circuitry 1722, baseband processing circuitry 1724, and application processing circuitry 1726 may be on separate chips or sets of chips. In alternative embodiments, part or all of baseband processing circuitry 1724 and application processing circuitry 1726 may be combined into one chip or set of chips, and RF transceiver circuitry 1722 may be on a separate chip or set of chips. In still alternative embodiments, part or all of RF transceiver circuitry 1722 and baseband processing circuitry 1724 may be on the same chip or set of chips, and application processing circuitry 1726 may be on a separate chip or set of chips. In yet other alternative embodiments, part or all of RF transceiver circuitry 1722, baseband processing circuitry 1724, and application processing circuitry 1726 may be combined in the same chip or set of chips. In some embodiments, RF transceiver circuitry 1722 may be a part of interface 1714. RF transceiver circuitry 1722 may condition RF signals for processing circuitry 1720.

In certain embodiments, some or all of the functionality described herein as being performed by a WD may be provided by processing circuitry 1720 executing instructions stored on device readable medium 1730, which in certain embodiments may be a computer-readable storage medium. In alternative embodiments, some or all of the functionality may be provided by processing circuitry 1720 without executing instructions stored on a separate or discrete device readable storage medium, such as in a hard-wired manner In any of those particular embodiments, whether executing instructions stored on a device readable storage medium or not, processing circuitry 1720 can be configured to perform the described functionality. The benefits provided by such functionality are not limited to processing circuitry 1720 alone or to other components of WD 1710, but are enjoyed by WD 1710 as a whole, and/or by end users and the wireless network generally.

Processing circuitry 1720 may be configured to perform any determining, calculating, or similar operations (e.g., certain obtaining operations) described herein as being performed by a WD. These operations, as performed by processing circuitry 1720, may include processing information obtained by processing circuitry 1720 by, for example, converting the obtained information into other information, comparing the obtained information or converted information to information stored by WD 1710, and/or performing one or more operations based on the obtained information or converted information, and as a result of said processing making a determination.

Device readable medium 1730 may be operable to store a computer program, software, an application including one or more of logic, rules, code, tables, etc. and/or other instructions capable of being executed by processing circuitry 1720. Device readable medium 1730 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1720. In some embodiments, processing circuitry 1720 and device readable medium 1730 may be considered to be integrated. User interface equipment 1732 may provide components that allow for a human user to interact with WD 1710. Such interaction may be of many forms, such as visual, audial, tactile, etc. User interface equipment 1732 may be operable to produce output to the user and to allow the user to provide input to WD 1710. The type of interaction may vary depending on the type of user interface equipment 1732 installed in WD 1710. For example, if WD 1710 is a smart phone, the interaction may be via a touch screen; if WD 1710 is a smart meter, the interaction may be through a screen that provides usage (e.g., the number of gallons used) or a speaker that provides an audible alert (e.g., if smoke is detected). User interface equipment 1732 may include input interfaces, devices and circuits, and output interfaces, devices and circuits. User interface equipment 1732 is configured to allow input of information into WD 1710, and is connected to processing circuitry 1720 to allow processing circuitry 1720 to process the input information. User interface equipment 1732 may include, for example, a microphone, a proximity or other sensor, keys/buttons, a touch display, one or more cameras, a USB port, or other input circuitry. User interface equipment 1732 is also configured to allow output of information from WD 1710, and to allow processing circuitry 1720 to output information from WD 1710. User interface equipment 1732 may include, for example, a speaker, a display, vibrating circuitry, a USB port, a headphone interface, or other output circuitry. Using one or more input and output interfaces, devices, and circuits, of user interface equipment 1732, WD 1710 may communicate with end users and/or the wireless network, and allow them to benefit from the functionality described herein.

Auxiliary equipment 1734 is operable to provide more specific functionality which may not be generally performed by WDs. This may comprise specialized sensors for doing measurements for various purposes, interfaces for additional types of communication such as wired communications etc. The inclusion and type of components of auxiliary equipment 1734 may vary depending on the embodiment and/or scenario.

Power source 1736 may, in some embodiments, be in the form of a battery or battery pack. Other types of power sources, such as an external power source (e.g., an electricity outlet), photovoltaic devices or power cells, may also be used. WD 1710 may further comprise power circuitry 1737 for delivering power from power source 1736 to the various parts of WD 1710 which need power from power source 1736 to carry out any functionality described or indicated herein. Power circuitry 1737 may in certain embodiments comprise power management circuitry. Power circuitry 1737 may additionally or alternatively be operable to receive power from an external power source; in which case WD 1710 may be connectable to the external power source (such as an electricity outlet) via input circuitry or an interface such as an electrical power cable. Power circuitry 1737 may also in certain embodiments be operable to deliver power from an external power source to power source 1736. This may be, for example, for the charging of power source 1736. Power circuitry 1737 may perform any formatting, converting, or other modification to the power from power source 1736 to make the power suitable for the respective components of WD 1710 to which power is supplied.

Figure 18:
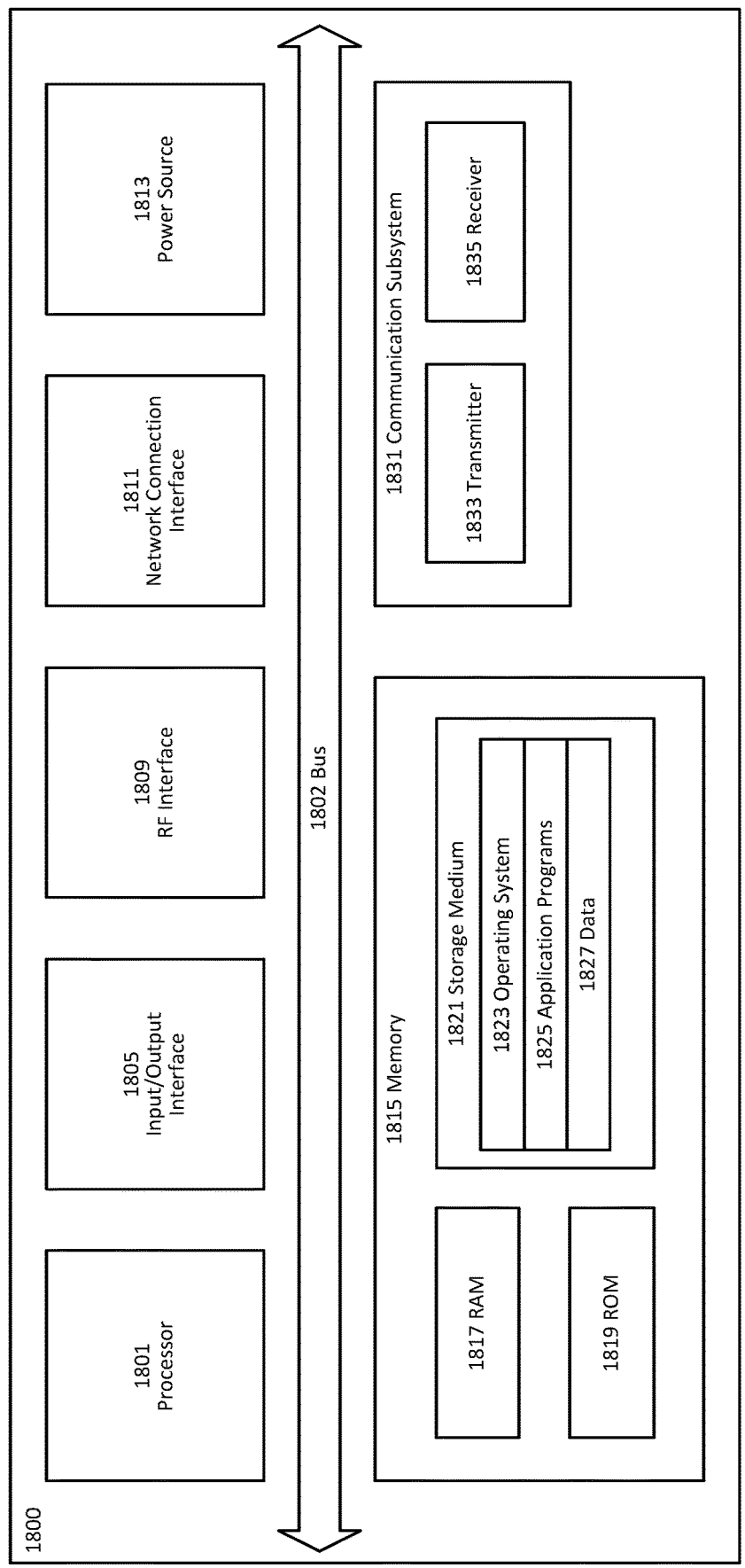
FIG. 18 is a block diagram of a wireless device (or user equipment) ("UE") in accordance with some embodiments

FIG. 18: User Equipment in accordance with some embodiments

FIG. 18 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 18200 may be any UE identified by the 3rd Generation Partnership Project (3GPP), including a NB-IoT UE, a machine type communication (MTC) UE, and/or an enhanced MTC (eMTC) UE. UE 1800, as illustrated in FIG. 18, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 18 is a UE, the components discussed herein are equally applicable to a WD, and vice-versa.

In FIG. 18, UE 1800 includes processing circuitry 1801 that is operatively coupled to input/output interface 1805, radio frequency (RF) interface 1809, network connection interface 1811, memory 1815 including random access memory (RAM) 1817, read-only memory (ROM) 1819, and storage medium 1821 or the like, communication subsystem 1831, power source 1833, and/or any other component, or any combination thereof. Storage medium 1821 includes operating system 1823, application program 1825, and data 1827. In other embodiments, storage medium 1821 may include other similar types of information. Certain UEs may utilize all of the components shown in FIG. 18, or only a subset of the components. The level of integration between the components may vary from one UE to another UE. Further, certain UEs may contain multiple instances of a component, such as multiple processors, memories, transceivers, transmitters, receivers, etc.

In FIG. 18, processing circuitry 1801 may be configured to process computer instructions and data. Processing circuitry 1801 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1801 may include two central processing units (CPUs). Data may be information in a form suitable for use by a computer.

In the depicted embodiment, input/output interface 1805 may be configured to provide a communication interface to an input device, output device, or input and output device. UE 1800 may be configured to use an output device via input/output interface 1805. An output device may use the same type of interface port as an input device. For example, a USB port may be used to provide input to and output from UE 1800. The output device may be a speaker, a sound card, a video card, a display, a monitor, a printer, an actuator, an emitter, a smartcard, another output device, or any combination thereof. UE 1800 may be configured to use an input device via input/output interface 1805 to allow a user to capture information into UE 1800. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 18, RF interface 1809 may be configured to provide a communication interface to RF components such as a transmitter, a receiver, and an antenna. Network connection interface 1811 may be configured to provide a communication interface to network 1843a. Network 1843a may encompass wired and/or wireless networks such as a local-area network (LAN), a wide-area network (WAN), a computer network, a wireless network, a telecommunications network, another like network or any combination thereof. For example, network 1843a may comprise a Wi-Fi network. Network connection interface 1811 may be configured to include a receiver and a transmitter interface used to communicate with one or more other devices over a communication network according to one or more communication protocols, such as Ethernet, TCP/IP, SONET, ATM, or the like. Network connection interface 1811 may implement receiver and transmitter functionality appropriate to the communication network links (e.g., optical, electrical, and the like). The transmitter and receiver functions may share circuit components, software or firmware, or alternatively may be implemented separately.

RAM 1817 may be configured to interface via bus 1802 to processing circuitry 1801 to provide storage or caching of data or computer instructions during the execution of software programs such as the operating system, application programs, and device drivers. ROM 1819 may be configured to provide computer instructions or data to processing circuitry 1801. For example, ROM 1819 may be configured to store invariant low-level system code or data for basic system functions such as basic input and output (I/O), startup, or reception of keystrokes from a keyboard that are stored in a non-volatile memory. Storage medium 1821 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1821 may be configured to include operating system 1823, application program 1825 such as a web browser application, a widget or gadget engine or another application, and data file 1827. Storage medium 1821 may store, for use by UE 1800, any of a variety of various operating systems or combinations of operating systems.

Storage medium 1821 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1821 may allow UE 1800 to access computer-executable instructions, application programs or the like, stored on transitory or non-transitory memory media, to off-load data, or to upload data. An article of manufacture, such as one utilizing a communication system may be tangibly embodied in storage medium 1821, which may comprise a device readable medium.

In FIG. 18, processing circuitry 1801 may be configured to communicate with network 1843b using communication subsystem 1831. Network 1843a and network 1843b may be the same network or networks or different network or networks. Communication subsystem 1831 may be configured to include one or more transceivers used to communicate with network 1843b. For example, communication subsystem 1831 may be configured to include one or more transceivers used to communicate with one or more remote transceivers of another device capable of wireless communication such as another WD, UE, or base station of a radio access network (RAN) according to one or more communication protocols, such as IEEE 802.18, CDMA, WCDMA, GSM, LTE, UTRAN, WiMax, or the like. Each transceiver may include transmitter 1833 and/or receiver 1835 to implement transmitter or receiver functionality, respectively, appropriate to the RAN links (e.g., frequency allocations and the like). Further, transmitter 1833 and receiver 1835 of each transceiver may share circuit components, software or firmware, or alternatively may be implemented separately.

In the illustrated embodiment, the communication functions of communication subsystem 1831 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1831 may include cellular communication, Wi-Fi communication, Bluetooth communication, and GPS communication. Network 1843b may encompass wired and/or wireless networks such as a local-area network (LAN), a wide-area network (WAN), a computer network, a wireless network, a telecommunications network, another like network or any combination thereof. For example, network 1843b may be a cellular network, a Wi-Fi network, and/or a near-field network. Power source 1813 may be configured to provide alternating current (AC) or direct current (DC) power to components of UE 1800.

The features, benefits and/or functions described herein may be implemented in one of the components of UE 1800 or partitioned across multiple components of UE 1800. Further, the features, benefits, and/or functions described herein may be implemented in any combination of hardware, software or firmware. In one example, communication subsystem 1831 may be configured to include any of the components described herein. Further, processing circuitry 1801 may be configured to communicate with any of such components over bus 1802. In another example, any of such components may be represented by program instructions stored in memory that when executed by processing circuitry 1801 perform the corresponding functions described herein. In another example, the functionality of any of such components may be partitioned between processing circuitry 1801 and communication subsystem 1831. In another example, the non-computationally intensive functions of any of such components may be implemented in software or firmware and the computationally intensive functions may be implemented in hardware.

Figure 19:
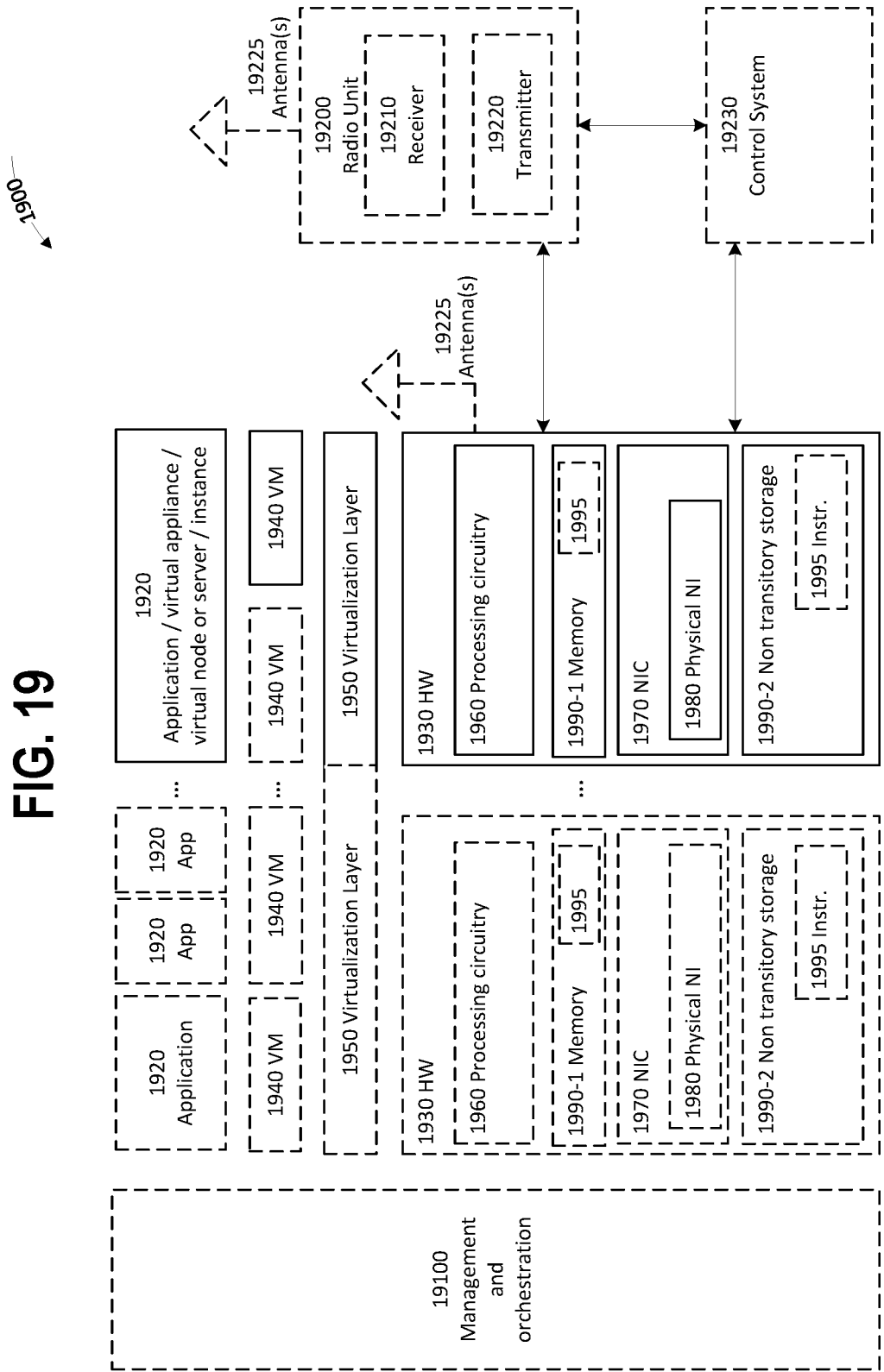
FIG. 19 is a block diagram of a virtualization environment in accordance with some embodiments.

FIG. 19 is a schematic block diagram illustrating a virtualization environment 1900 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1900 hosted by one or more of hardware nodes 1930. Further, in embodiments in which the virtual node is not a radio access node or does not require radio connectivity (e.g., a core network node), then the network node may be entirely virtualized.

The functions may be implemented by one or more applications 1920 (which may alternatively be called software instances, virtual appliances, network functions, virtual nodes, virtual network functions, etc.) operative to implement some of the features, functions, and/or benefits of some of the embodiments disclosed herein. Applications 1920 are run in virtualization environment 1900 which provides hardware 1930 comprising processing circuitry 1960 and memory 1990. Memory 1990 contains instructions 1995 executable by processing circuitry 1960 whereby application 1920 is operative to provide one or more of the features, benefits, and/or functions disclosed herein.

Virtualization environment 1900, comprises general-purpose or special-purpose network hardware devices 1930 comprising a set of one or more processors or processing circuitry 1960, which may be commercial off-the-shelf (COTS) processors, dedicated Application Specific Integrated Circuits (ASICs), or any other type of processing circuitry including digital or analog hardware components or special purpose processors. Each hardware device may comprise memory 1990-1 which may be non-persistent memory for temporarily storing instructions 1995 or software executed by processing circuitry 1960. Each hardware device may comprise one or more network interface controllers (NICs) 1970, also known as network interface cards, which include physical network interface 1980. Each hardware device may also include non-transitory, persistent, machine-readable storage media 1990-2 having stored therein software 1995 and/or instructions executable by processing circuitry 1960. Software 1995 may include any type of software including software for instantiating one or more virtualization layers 1950 (also referred to as hypervisors), software to execute virtual machines 1940 as well as software allowing it to execute functions, features and/or benefits described in relation with some embodiments described herein.

Virtual machines 1940, comprise virtual processing, virtual memory, virtual networking or interface and virtual storage, and may be run by a corresponding virtualization layer 1950 or hypervisor. Different embodiments of the instance of virtual appliance 1920 may be implemented on one or more of virtual machines 1940, and the implementations may be made in different ways.

During operation, processing circuitry 1960 executes software 1995 to instantiate the hypervisor or virtualization layer 1950, which may sometimes be referred to as a virtual machine monitor (VMM). Virtualization layer 1950 may present a virtual operating platform that appears like networking hardware to virtual machine 1940.

As shown in FIG. 19, hardware 1930 may be a standalone network node with generic or specific components. Hardware 1930 may comprise antenna 19225 and may implement some functions via virtualization. Alternatively, hardware 1930 may be part of a larger cluster of hardware (e.g. such as in a data center or customer premise equipment (CPE)) where many hardware nodes work together and are managed via management and orchestration (MANO) 19100, which, among others, oversees lifecycle management of applications 1920.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1940 may be a software implementation of a physical machine that runs programs as if they were executing on a physical, non-virtualized machine. Each of virtual machines 1940, and that part of hardware 1930 that executes that virtual machine, be it hardware dedicated to that virtual machine and/or hardware shared by that virtual machine with others of the virtual machines 1940, forms a separate virtual network elements (VNE).

Still in the context of NFV, Virtual Network Function (VNF) is responsible for handling specific network functions that run in one or more virtual machines 1940 on top of hardware networking infrastructure 1930 and corresponds to application 1920 in FIG. 19.

In some embodiments, one or more radio units 19200 that each include one or more transmitters 19220 and one or more receivers 19210 may be coupled to one or more antennas 19225. Radio units 19200 may communicate directly with hardware nodes 1930 via one or more appropriate network interfaces and may be used in combination with the virtual components to provide a virtual node with radio capabilities, such as a radio access node or a base station.

In some embodiments, some signalling can be effected with the use of control system 19230 which may alternatively be used for communication between the hardware nodes 1930 and radio units 19200.

Figure 20:
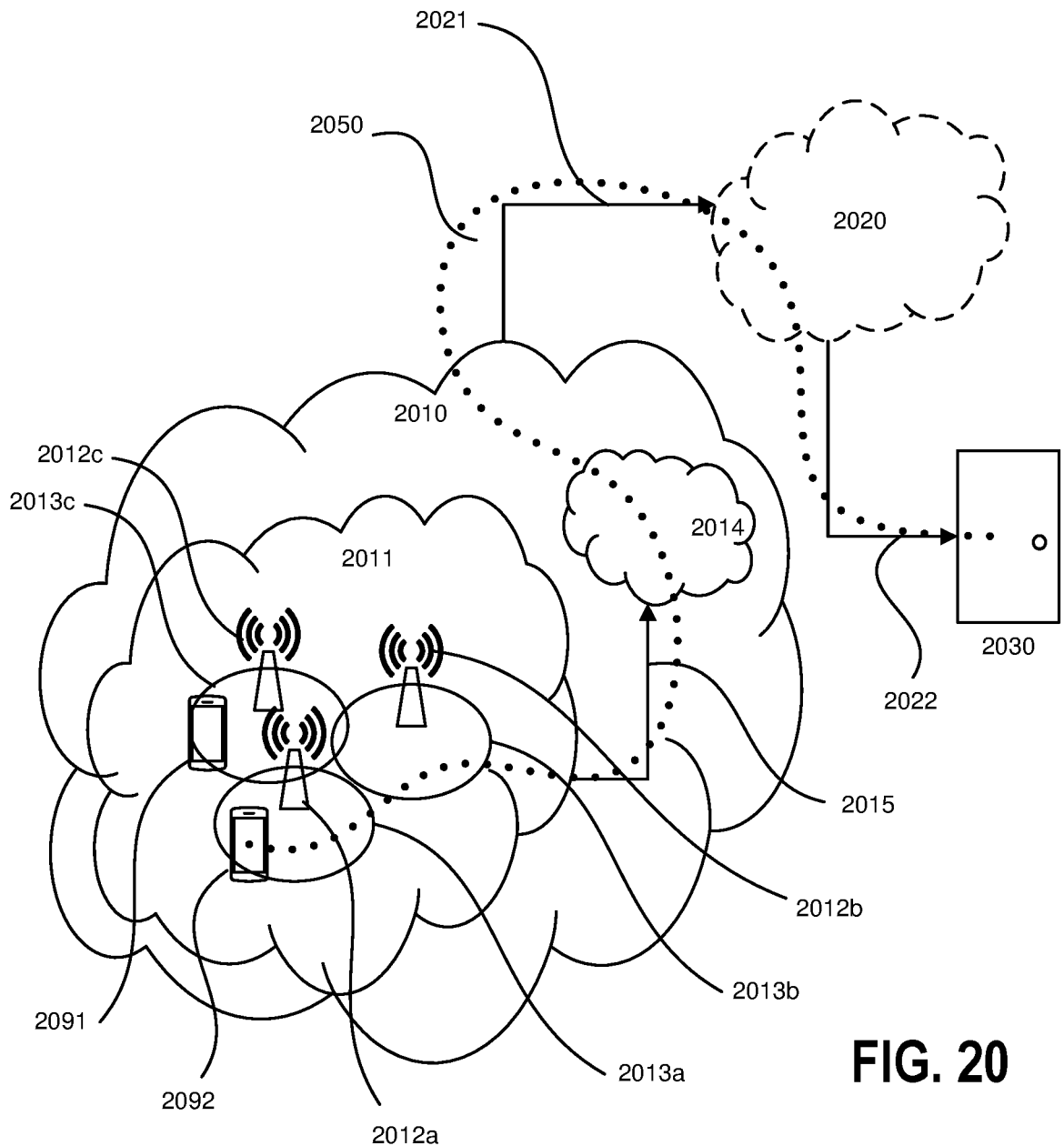
FIG. 20 is a block diagram of a telecommunication network connected via an intermediate network to a host computer in accordance with some embodiments.

With reference to FIG. 20, in accordance with an embodiment, a communication system includes telecommunication network 2010, such as a 3GPP-type cellular network, which comprises access network 2011, such as a radio access network, and core network 2014. Access network 2011 comprises a plurality of base stations 2012a, 2012b, 2012c, such as NBs, eNBs, gNBs or other types of wireless access points, each defining a corresponding coverage area 2013a, 2013b, 2013c. Each base station 2012a, 2012b, 2012c is connectable to core network 2014 over a wired or wireless connection 2015. A first UE 2091 located in coverage area 2013c is configured to wirelessly connect to, or be paged by, the corresponding base station 2012c. A second UE 2092 in coverage area 2013a is wirelessly connectable to the corresponding base station 2012a. While a plurality of UEs 2091, 2092 are illustrated in this example, the disclosed embodiments are equally applicable to a situation where a sole UE is in the coverage area or where a sole UE is connecting to the corresponding base station 2012.

Telecommunication network 2010 is itself connected to host computer 2030, which may be embodied in the hardware and/or software of a standalone server, a cloud-implemented server, a distributed server or as processing resources in a server farm. Host computer 2030 may be under the ownership or control of a service provider, or may be operated by the service provider or on behalf of the service provider. Connections 2021 and 2022 between telecommunication network 2010 and host computer 2030 may extend directly from core network 2014 to host computer 2030 or may go via an optional intermediate network 2020. Intermediate network 2020 may be one of, or a combination of more than one of, a public, private or hosted network; intermediate network 2020, if any, may be a backbone network or the Internet; in particular, intermediate network 2020 may comprise two or more sub-networks (not shown).

The communication system of FIG. 20 as a whole enables connectivity between the connected UEs 2091, 2092 and host computer 2030. The connectivity may be described as an over-the-top (OTT) connection 2050. Host computer 2030 and the connected UEs 2091, 2092 are configured to communicate data and/or signaling via OTT connection 2050, using access network 2011, core network 2014, any intermediate network 2020 and possible further infrastructure (not shown) as intermediaries. OTT connection 2050 may be transparent in the sense that the participating communication devices through which OTT connection 2050 passes are unaware of routing of uplink and downlink communications. For example, base station 2012 may not or need not be informed about the past routing of an incoming downlink communication with data originating from host computer 2030 to be forwarded (e.g., handed over) to a connected UE 2091. Similarly, base station 2012 need not be aware of the future routing of an outgoing uplink communication originating from the UE 2091 towards the host computer 2030.

Figure 21:
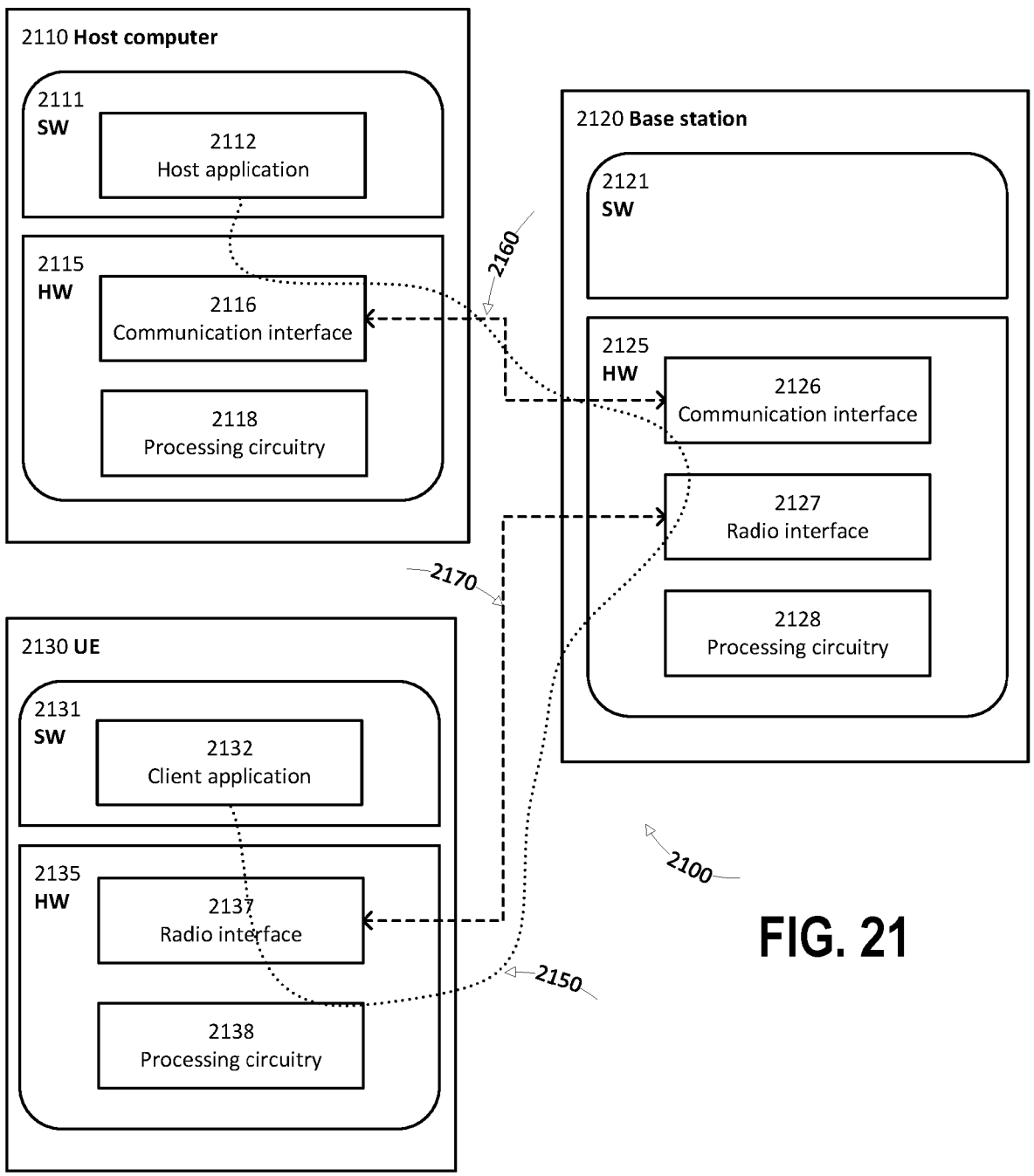
FIG. 21 is a block diagram of a host computer communicating via a base station with a wireless device over a partially wireless connection in accordance with some embodiments.

FIG. 21: Host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 21. In communication system 2100, host computer 2110 comprises hardware 2115 including communication interface 2116 configured to set up and maintain a wired or wireless connection with an interface of a different communication device of communication system 2100. Host computer 2110 further comprises processing circuitry 2118, which may have storage and/or processing capabilities. In particular, processing circuitry 2118 may comprise one or more programmable processors, application-specific integrated circuits, field programmable gate arrays or combinations of these (not shown) adapted to execute instructions. Host computer 2110 further comprises software 2111, which is stored in or accessible by host computer 2110 and executable by processing circuitry 2118. Software 2111 includes host application 2112. Host application 2112 may be operable to provide a service to a remote user, such as UE 2130 connecting via OTT connection 2150 terminating at UE 2130 and host computer 2110. In providing the service to the remote user, host application 2112 may provide user data which is transmitted using OTT connection 2150.

Communication system 2100 further includes base station 2120 provided in a telecommunication system and comprising hardware 2125 enabling it to communicate with host computer 2110 and with UE 2130. Hardware 2125 may include communication interface 2126 for setting up and maintaining a wired or wireless connection with an interface of a different communication device of communication system 2100, as well as radio interface 2127 for setting up and maintaining at least wireless connection 2170 with UE 2130 located in a coverage area (not shown in FIG. 21) served by base station 2120. Communication interface 2126 may be configured to facilitate connection 2160 to host computer 2110. Connection 2160 may be direct or it may pass through a core network (not shown in FIG. 21) of the telecommunication system and/or through one or more intermediate networks outside the telecommunication system. In the embodiment shown, hardware 2125 of base station 2120 further includes processing circuitry 2128, which may comprise one or more programmable processors, application-specific integrated circuits, field programmable gate arrays or combinations of these (not shown) adapted to execute instructions. Base station 2120 further has software 2121 stored internally or accessible via an external connection.

Communication system 2100 further includes UE 2130 already referred to. Its hardware 2135 may include radio interface 2137 configured to set up and maintain wireless connection 2170 with a base station serving a coverage area in which UE 2130 is currently located. Hardware 2135 of UE 2130 further includes processing circuitry 2138, which may comprise one or more programmable processors, application-specific integrated circuits, field programmable gate arrays or combinations of these (not shown) adapted to execute instructions. UE 2130 further comprises software 2131, which is stored in or accessible by UE 2130 and executable by processing circuitry 2138. Software 2131 includes client application 2132. Client application 2132 may be operable to provide a service to a human or non-human user via UE 2130, with the support of host computer 2110. In host computer 2110, an executing host application 2112 may communicate with the executing client application 2132 via OTT connection 2150 terminating at UE 2130 and host computer 2110. In providing the service to the user, client application 2132 may receive request data from host application 2112 and provide user data in response to the request data. OTT connection 2150 may transfer both the request data and the user data. Client application 2132 may interact with the user to generate the user data that it provides.

It is noted that host computer 2110, base station 2120 and UE 2130 illustrated in FIG. 21 may be similar or identical to host computer 2030, one of base stations 2012a, 2012b, 2012c and one of UEs 2091, 2092 of FIG. 20, respectively. This is to say, the inner workings of these entities may be as shown in FIG. 21 and independently, the surrounding network topology may be that of FIG. 20.

In FIG. 21, OTT connection 2150 has been drawn abstractly to illustrate the communication between host computer 2110 and UE 2130 via base station 2120, without explicit reference to any intermediary devices and the precise routing of messages via these devices. Network infrastructure may determine the routing, which it may be configured to hide from UE 2130 or from the service provider operating host computer 2110, or both. While OTT connection 2150 is active, the network infrastructure may further take decisions by which it dynamically changes the routing (e.g., on the basis of load balancing consideration or reconfiguration of the network).

Wireless connection 2170 between UE 2130 and base station 2120 is in accordance with the teachings of the embodiments described throughout this disclosure. One or more of the various embodiments may improve the performance of OTT services provided to UE 2130 using OTT connection 2150, in which wireless connection 2170 forms the last segment. More precisely, the teachings of these embodiments may improve the deblock filtering for video processing and thereby provide benefits such as improved video encoding and/or decoding.

A measurement procedure may be provided for the purpose of monitoring data rate, latency and other factors on which the one or more embodiments improve. There may further be an optional network functionality for reconfiguring OTT connection 2150 between host computer 2110 and UE 2130, in response to variations in the measurement results. The measurement procedure and/or the network functionality for reconfiguring OTT connection 2150 may be implemented in software 2111 and hardware 2115 of host computer 2110 or in software 2131 and hardware 2135 of UE 2130, or both. In embodiments, sensors (not shown) may be deployed in or in association with communication devices through which OTT connection 2150 passes; the sensors may participate in the measurement procedure by supplying values of the monitored quantities exemplified above, or supplying values of other physical quantities from which software 2111, 2131 may compute or estimate the monitored quantities. The reconfiguring of OTT connection 2150 may include message format, retransmission settings, preferred routing etc.; the reconfiguring need not affect base station 2120, and it may be unknown or imperceptible to base station 2120. Such procedures and functionalities may be known and practiced in the art. In certain embodiments, measurements may involve proprietary UE signaling facilitating host computer 2110's measurements of throughput, propagation times, latency and the like. The measurements may be implemented in that software 2111 and 2131 causes messages to be transmitted, in particular empty or 'dummy' messages, using OTT connection 2150 while it monitors propagation times, errors etc.

Figure 22:
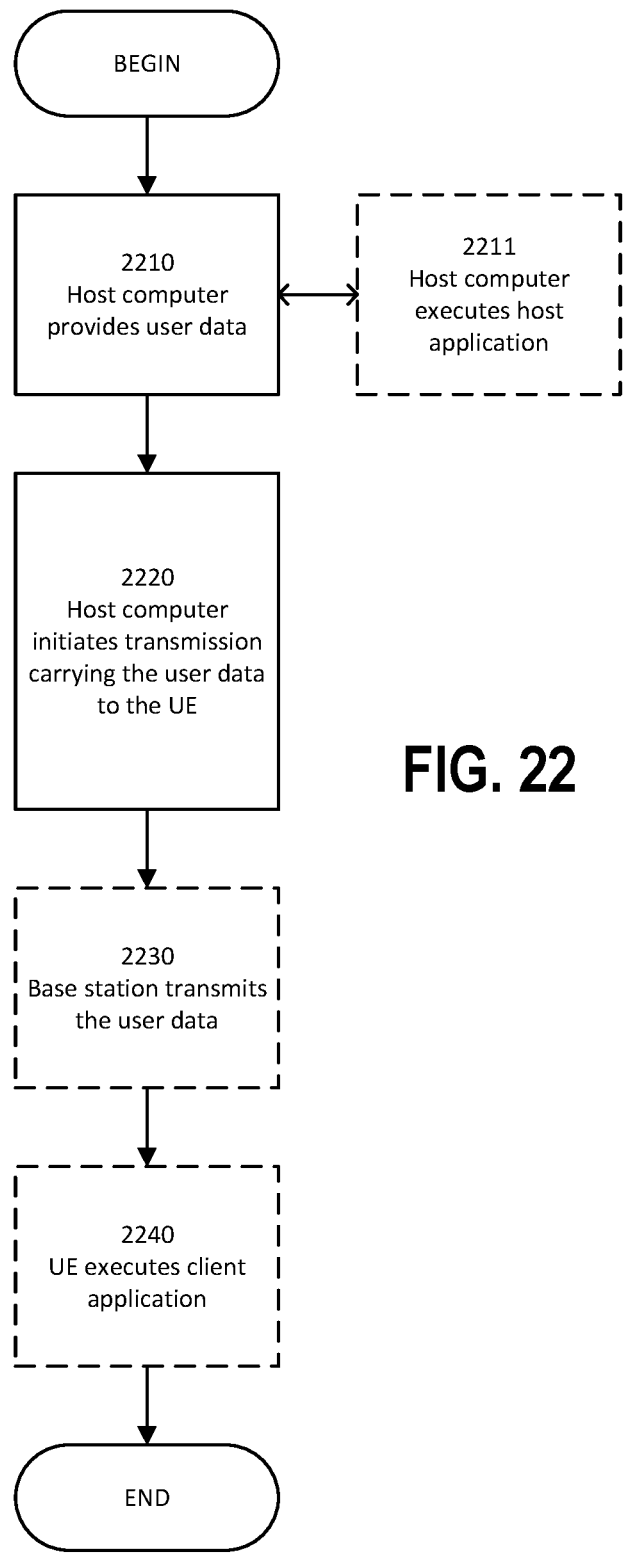
FIG. 22 is a block diagram of methods implemented in a communication system including a host computer, a base station, and a wireless device in accordance with some embodiments.

FIG. 22 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 22 will be included in this section. In step 2210, the host computer provides user data. In substep 2211 (which may be optional) of step 2210, the host computer provides the user data by executing a host application. In step 2220, the host computer initiates a transmission carrying the user data to the UE. In step 2230 (which may be optional), the base station transmits to the UE the user data which was carried in the transmission that the host computer initiated, in accordance with the teachings of the embodiments described throughout this disclosure. In step 2240 (which may also be optional), the UE executes a client application associated with the host application executed by the host computer.

Figure 23:
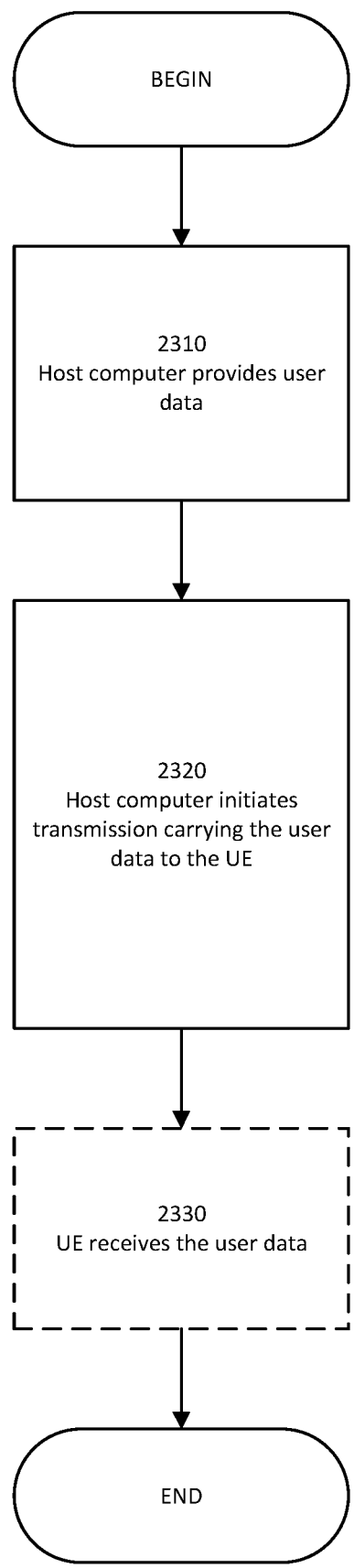
FIG. 23 is a block diagram of methods implemented in a communication system including a host computer, a base station, and a wireless device in accordance with some embodiments.

FIG. 23 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 23 will be included in this section. In step 2310 of the method, the host computer provides user data. In an optional substep (not shown) the host computer provides the user data by executing a host application. In step 2320, the host computer initiates a transmission carrying the user data to the UE. The transmission may pass via the base station, in accordance with the teachings of the embodiments described throughout this disclosure. In step 2330 (which may be optional), the UE receives the user data carried in the transmission.

Figure 24:
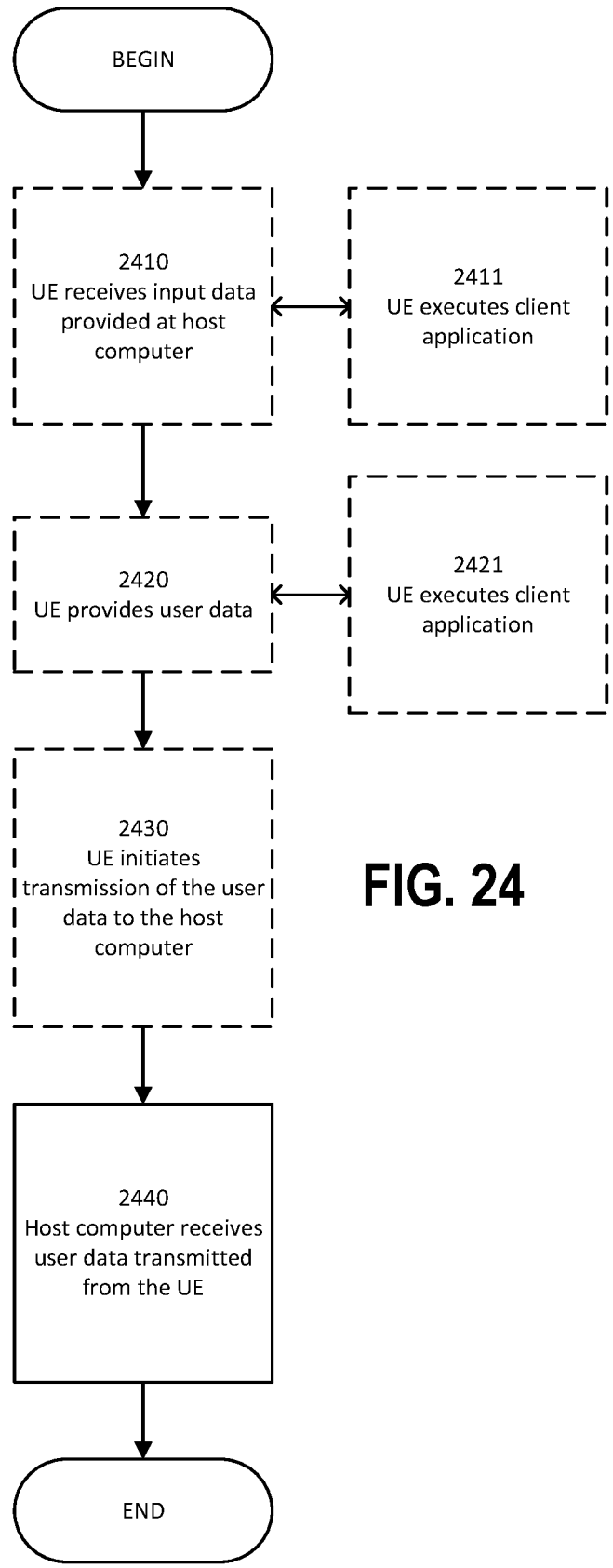
FIG. 24 is a block diagram of methods implemented in a communication system including a host computer, a base station, and a wireless device in accordance with some embodiments.

FIG. 24 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 24 will be included in this section. In step 2410 (which may be optional), the UE receives input data provided by the host computer. Additionally or alternatively, in step 2420, the UE provides user data. In substep 2421 (which may be optional) of step 2420, the UE provides the user data by executing a client application. In substep 2411 (which may be optional) of step 2410, the UE executes a client application which provides the user data in reaction to the received input data provided by the host computer. In providing the user data, the executed client application may further consider user input received from the user. Regardless of the specific manner in which the user data was provided, the UE initiates, in substep 2430 (which may be optional), transmission of the user data to the host computer. In step 2440 of the method, the host computer receives the user data transmitted from the UE, in accordance with the teachings of the embodiments described throughout this disclosure.

Figure 25:
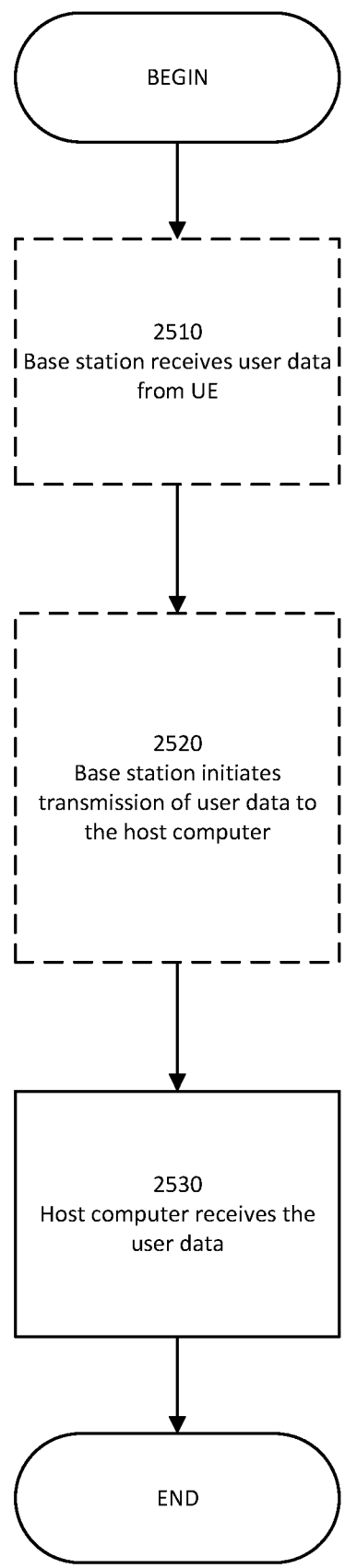
FIG. 25 is a block diagram of methods implemented in a communication system including a host computer, a base station, and a wireless device in accordance with some embodiments.

FIG. 25 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 25 will be included in this section. In step 2510 (which may be optional), in accordance with the teachings of the embodiments described throughout this disclosure, the base station receives user data from the UE. In step 2520 (which may be optional), the base station initiates transmission of the received user data to the host computer. In step 2530 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

What is claimed is:

1. A method of operating a wireless device that is communicating with a network node of a communications network via a non-terrestrial communication path that comprises a plurality of satellites and a plurality of satellite gateways, the method comprising:
determining that communication between the wireless device and the network node will experience a communication interrupting transition during a transition period in which the non-terrestrial communication path between the wireless device and the network node will be interrupted; and
adjusting a PHY layer procedure of the wireless device to mitigate switching problems with a first satellite of the plurality of satellites during and/or after the interruption by configuring a transmission gap during uplink and/or downlink data transmission, the transmission gap being greater than or equal to the transition period.

2. The method of claim 1, wherein adjusting the PHY layer procedure comprises:
pausing communication with the first satellite during the transition period; and
resuming communication with the first satellite after the transition period.

3. The method of claim 2, wherein resuming communication with the first satellite after the transition period comprises communicating with a second satellite of the plurality of satellites after the transition period, and
wherein the wireless device communicated with the first satellite prior to the transition period and the first satellite is different from the second satellite.

4. The method of claim 2, further comprising communicating with a first cell of the first satellite of the plurality of satellites prior to the transition period, and
wherein resuming communication with the first satellite after the transition comprises communicating with a second cell of the first satellite after the transition period.

5. The method of claim 2, wherein determining that the communication between the wireless device and the network node will experience a communication interrupting transition comprises receiving an indication that the network node of the communications network has activated access barring with respect to the wireless device in anticipation of the communication interrupting transition.

6. The method of claim 5, wherein the network node activates access barring based on a class of the wireless device.

7. The method of claim 5, wherein the network node activates access barring based on a cell of the first satellite, wherein the wireless device communicates with the cell.

8. The method of claim 1, further comprising receiving a message from the network node of the communications network, the message instructing the wireless device to adjust a timing advance and/or a Doppler frequency shift,
wherein adjusting a PHY layer procedure comprises adjusting the timing advance and/or the Doppler frequency shift in response to the message from the network node.

9. The method of claim 1, further comprising receiving downlink control information from the network node in the communications network.

10. The method of claim 1, wherein adjusting the PHY layer procedure comprises configuring a plurality of periodic transmission gaps based on a plurality of periodic transition periods, wherein the plurality of periodic transmission gaps comprises the transmission gap and the plurality of periodic transition periods comprises the transition period.

11. The method of claim 9, wherein the downlink control information includes a new downlink control information format and/or a repurposed existing downlink control information field.

12. The method of claim 1, wherein determining that the communication between the wireless device and the network node will experience the communication interrupting transition during the transition period comprises:
determining a coupling loss between the wireless device and the first satellite; and
determining that the communication between the wireless device and the network node will experience the communication interruption,
wherein adjusting the PHY layer procedures comprises adapting an uplink transmission power of the wireless device based on the coupling loss between the wireless device and the first satellite.

13. The method of claim 1, wherein adjusting the PHY layer procedures comprises:
ignoring a current coupling loss estimate;
pausing subsequent uplink transmissions until a new coupling loss estimate has been determined;
recalibrating an uplink power control based on downlink signal measurements from a second satellite of the plurality of satellites; and
resuming uplink transmissions, wherein the uplink transmissions are sent to the second satellite instead of the first satellite.

14. The method of claim 1, wherein the plurality of satellites are non-geostationary satellites, and
wherein the network node is a ground network node.

15. The method of claim 1, wherein the communication path is altered in response to a first access link between the wireless device and the first satellite of the plurality of satellites being switched to a second access link between the wireless device and a second satellite.

16. The method of claim 1, wherein the communication path is altered in response to a first feeder link between the first satellite and a first satellite gateway being switched to a second feeder link between the first satellite and a second satellite gateway.

17. A method of operating a network node that is communicating with a wireless device via a non-terrestrial network that comprises a plurality of satellite gateways and a plurality of satellites, the method comprising:
determining that communication between the network node and the wireless device will experience a communication interruption during a transition period, the transition period comprising a time period in which a communication path between the network node and the wireless device will be interrupted; and providing downlink control information to the wireless device to mitigate switching problems during and/or after the communication interruption, the downlink control information including an indication that the wireless device configure a transmission gap during uplink and/or downlink data transmission, the transmission gap being greater than or equal to the transition period.

18. The method of claim 17, further comprising:

determining the time period of the transition period associated with the wireless device and a first satellite of the plurality of satellites, wherein providing the information to the wireless device comprises providing instructions to pause communication with the first satellite during the time period.

19. The method of claim 18, further comprising:

receiving velocity information from the wireless device, the velocity information including a speed and a direction of movement of the wireless device; and receiving velocity information for the first satellite, wherein the transition period is determined based on the received velocity information for the wireless device and/or the received velocity information for the first satellite.

20. The method of claim 17, wherein the communication path will be altered during the transition period by one of:

a transition from a first satellite of the plurality of satellites to a second satellite of the plurality of satellites;

a transition from a first cell of the first satellite to a second cell of the first satellite; and a transition in communication between the first satellite and a first satellite gateway of the plurality of satellite gateways and a second satellite gateway of the plurality of satellites gateways, wherein the first and second satellite gateways are provided by terrestrial network nodes.

21. The method of claim 17, wherein the network node is a ground network node.

22. The method of claim 17, wherein the network node is a base station in a 5G communications network.

23. A wireless device operable to communicate with a network node of a communications network via a non-terrestrial communication path that comprises one of a plurality of satellites and one of a plurality of satellite gateways, wherein the wireless device comprising:

processing circuitry; and memory coupled with the processing circuitry, wherein the memory includes instructions that when executed by the processing circuitry causes the wireless device to perform operations comprising:

determining that communication between the wireless device and the network node will experience a communication interrupting transition during a transition period in which the non-terrestrial communication path between the wireless device and the network node will be interrupted; and adjusting a PHY layer procedure of the wireless device to mitigate switching problems with a first satellite of the plurality of satellites during and/or after the interruption by configuring a transmission gap during uplink and/or downlink data transmission, the transmission gap being greater than or equal to the transition period.

24. A network node operable to communicate with a wireless device via a non-terrestrial network that comprises a first satellite gateway of a plurality of satellite gateways and a first satellite of a plurality of satellites and, the network node comprising:

processing circuitry; and memory coupled with the processing circuitry, wherein the memory includes instructions that when executed by the processing circuitry causes the wireless device to perform operations comprising:

determining that communication between the network node and the wireless device will experience a communication interruption during a transition period, the transition period comprising a time period in which a communication path between the network node and the wireless device will be interrupted; and providing downlink control information to the wireless device to mitigate switching problems during and/or after the communication interruption, the downlink control information including an indication that the wireless device configure a transmission gap during uplink and/or downlink data transmission, the transmission gap being greater than or equal to the transition period.

* * * * *